US012181664B2

(12) United States Patent
Luo et al.

(10) Patent No.: US 12,181,664 B2
(45) Date of Patent: Dec. 31, 2024

(54) HEAD-MOUNTED AUGMENTED REALITY STEREO VISION OPTICAL FILM ON GLASSES

(71) Applicant: Industrial Technology Research Institute, Hsinchu (TW)

(72) Inventors: Cheng-Jhih Luo, Hualien County (TW); Chia-Hsin Chao, Hsinchu County (TW); Wei-Cheng Chao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 57 days.

(21) Appl. No.: 18/089,532

(22) Filed: Dec. 27, 2022

(65) Prior Publication Data

US 2023/0185086 A1    Jun. 15, 2023

Related U.S. Application Data

(63) Continuation-in-part of application No. 17/563,105, filed on Dec. 28, 2021.

(30) Foreign Application Priority Data

Dec. 15, 2021   (TW) .................................. 110146849
Nov. 25, 2022   (TW) .................................. 111145301

(51) Int. Cl.
G02B 27/00      (2006.01)
G02B 1/00       (2006.01)
(Continued)

(52) U.S. Cl.
CPC ......... *G02B 27/0093* (2013.01); *G02B 1/002* (2013.01); *G02B 3/08* (2013.01);
(Continued)

(58) Field of Classification Search
CPC ................ G02B 1/002; G02B 27/0093; G02B 27/0172; G02B 27/18; G02B 3/08;
(Continued)

(56) References Cited

U.S. PATENT DOCUMENTS 9,977,496 B2   5/2018   Maltz
10,564,330 B2  2/2020   Ahmed et al.
(Continued)

FOREIGN PATENT DOCUMENTS

CN    110488494    11/2019
CN    113126298    7/2021
(Continued)

OTHER PUBLICATIONS

"Office Action of Taiwan Counterpart Application", issued on Jun. 13, 2023, p. 1-p. 7.

*Primary Examiner* — Stacy Khoo
(74) *Attorney, Agent, or Firm* — JCIPRNET

(57) ABSTRACT

A head-mounted augmented reality stereo vision optical film, including a light transmitting display layer, an optical projection layer, and an eye tracking layer, is provided. The light transmitting display layer has multiple pixel units. The optical projection layer has multiple light guide units. The light guide unit includes a pinhole configured corresponding to at least one of the pixel units. The eye tracking layer has multiple micro sensing elements.

18 Claims, 21 Drawing Sheets

(51) Int. Cl.
*G02B 3/08* (2006.01)
*G02B 27/01* (2006.01)
*G02B 27/18* (2006.01)

(52) U.S. Cl.
CPC ......... *G02B 27/0172* (2013.01); *G02B 27/18* (2013.01); *G02B 2027/0134* (2013.01); *G02B 2027/0178* (2013.01)

(58) Field of Classification Search
CPC .... G02B 2027/0123; G02B 2027/0134; G02B 2027/0138; G02B 2027/0178; G02B 2027/0187
See application file for complete search history.

(56) References Cited

U.S. PATENT DOCUMENTS

| | | | |
|---|---|---|---|
| 10,652,529 B2 | 5/2020 | Lamkin et al. | |
| 10,725,302 B1* | 7/2020 | Sharma | G06F 3/012 |
| 10,761,328 B2 | 9/2020 | Hu | |
| 10,979,635 B2 | 4/2021 | Hu et al. | |
| 11,073,906 B1 | 7/2021 | Hudman et al. | |
| 2019/0265476 A1* | 8/2019 | Blum | G02B 3/0056 |
| 2020/0089318 A1 | 3/2020 | Brennan et al. | |
| 2020/0132992 A1 | 4/2020 | Ouderkirk et al. | |
| 2020/0266252 A1 | 8/2020 | Cancel Olmo et al. | |
| 2021/0003900 A1 | 1/2021 | Chen | |
| 2021/0005681 A1 | 1/2021 | Chen | |
| 2022/0317496 A1* | 10/2022 | Matsunaga | G02F 1/13338 |
| 2023/0155085 A1* | 5/2023 | Kreiner | H01L 33/46 257/79 |

FOREIGN PATENT DOCUMENTS

| | | |
|---|---|---|
| CN | 110208947 | 10/2021 |
| TW | 201905539 | 2/2019 |
| TW | 201937234 | 9/2019 |
| TW | 201945791 | 12/2019 |
| TW | I683136 | 1/2020 |
| TW | I717890 | 2/2021 |
| TW | I746370 | 11/2021 |

* cited by examiner

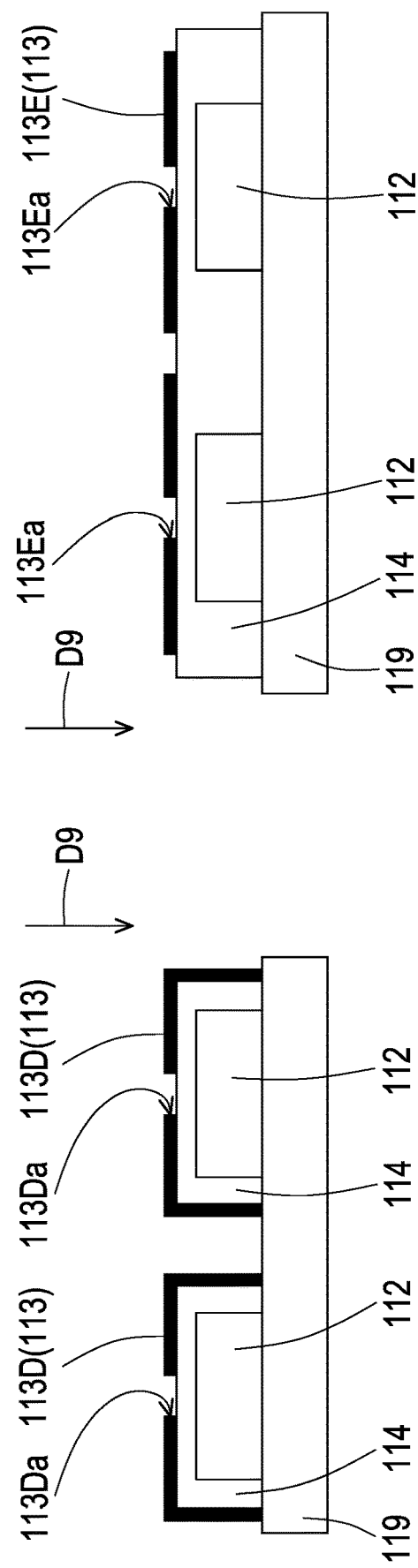

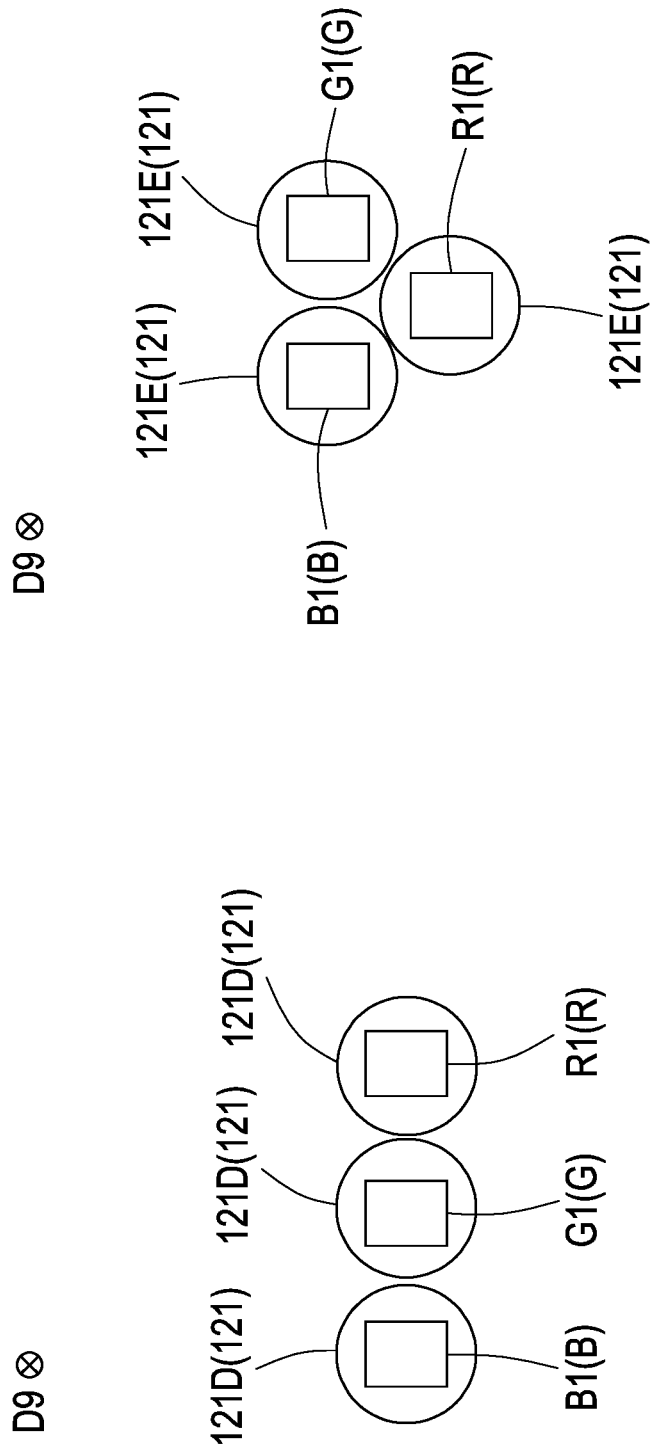

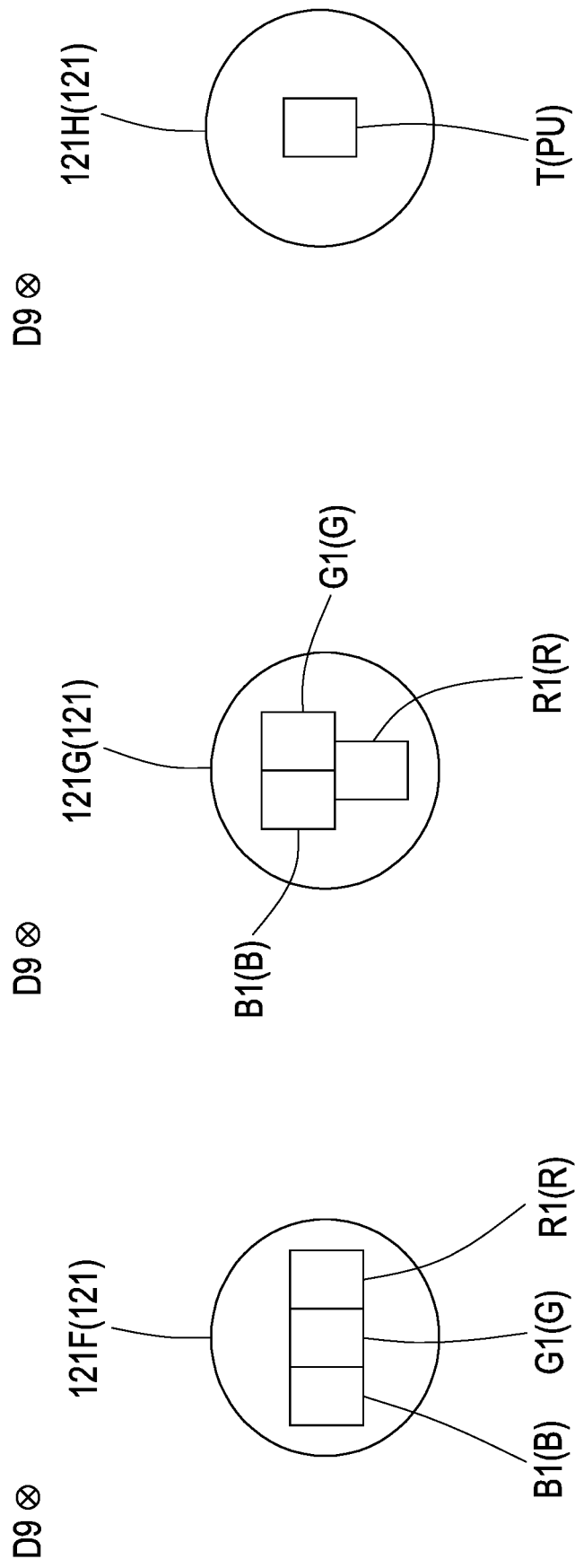

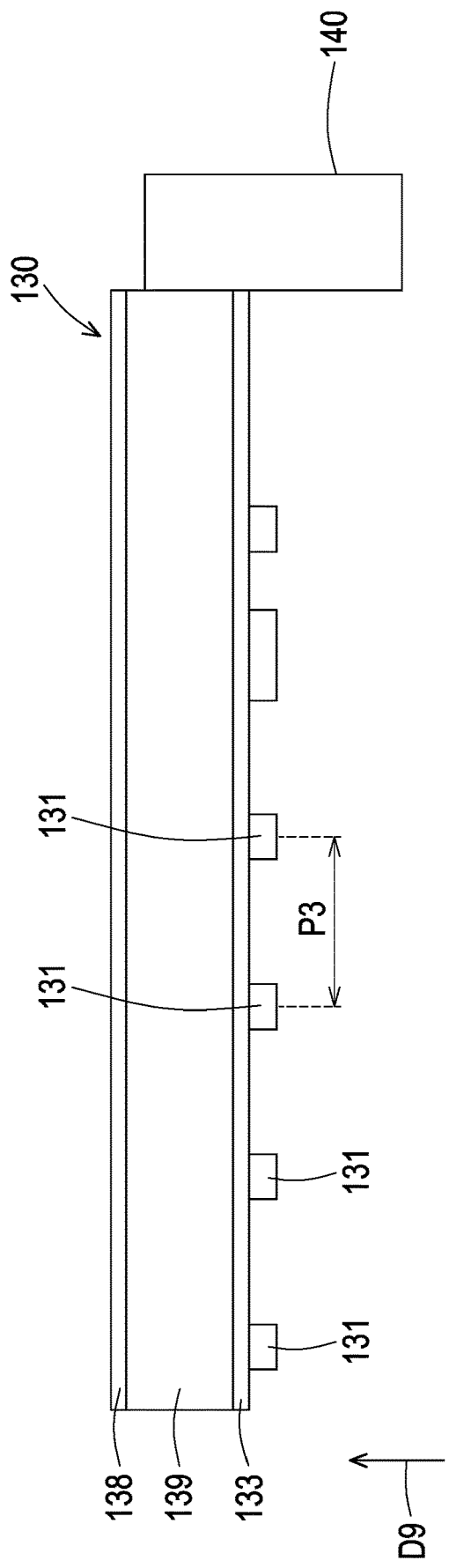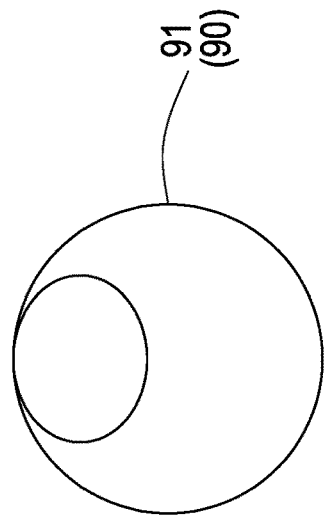
FIG. 4A

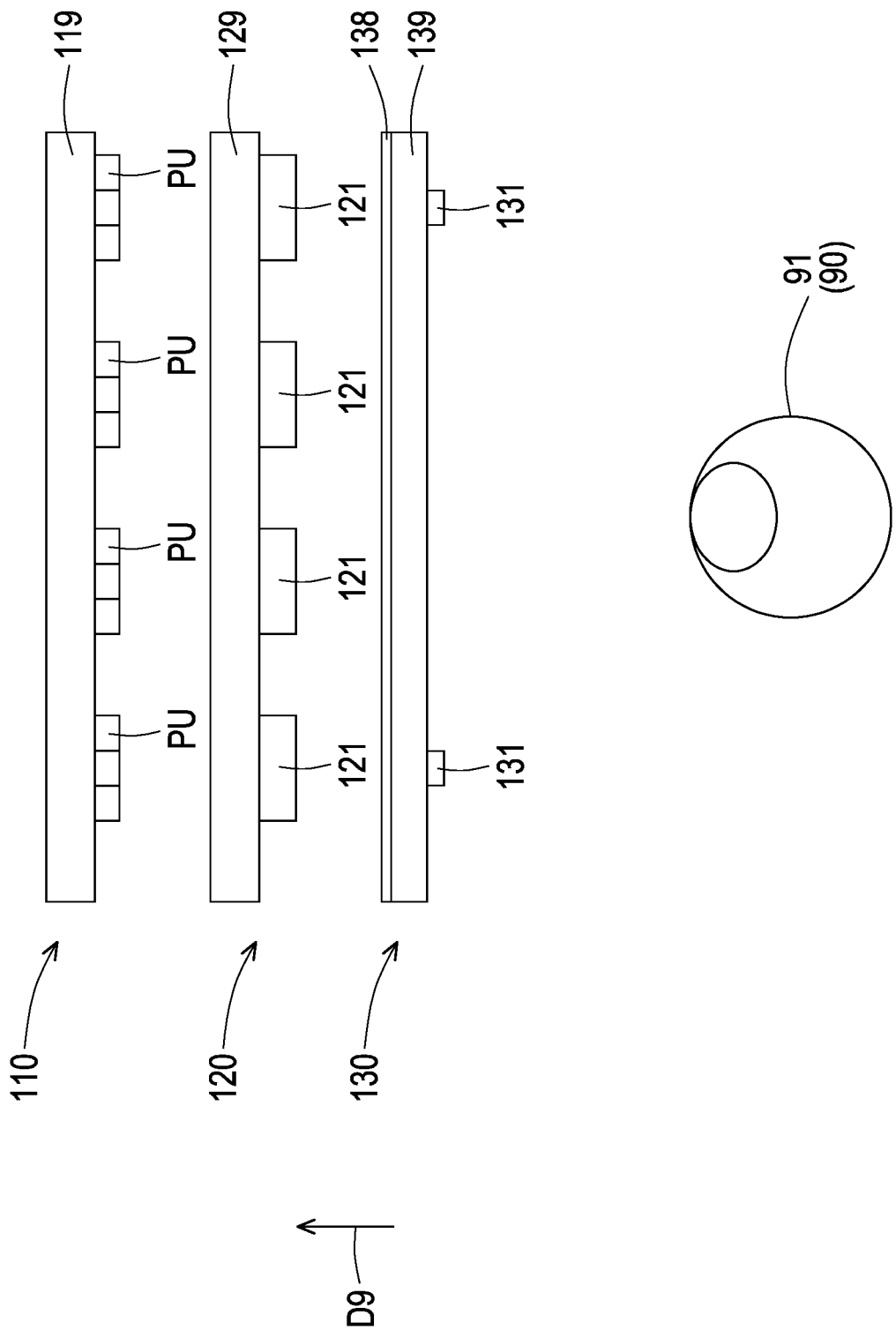

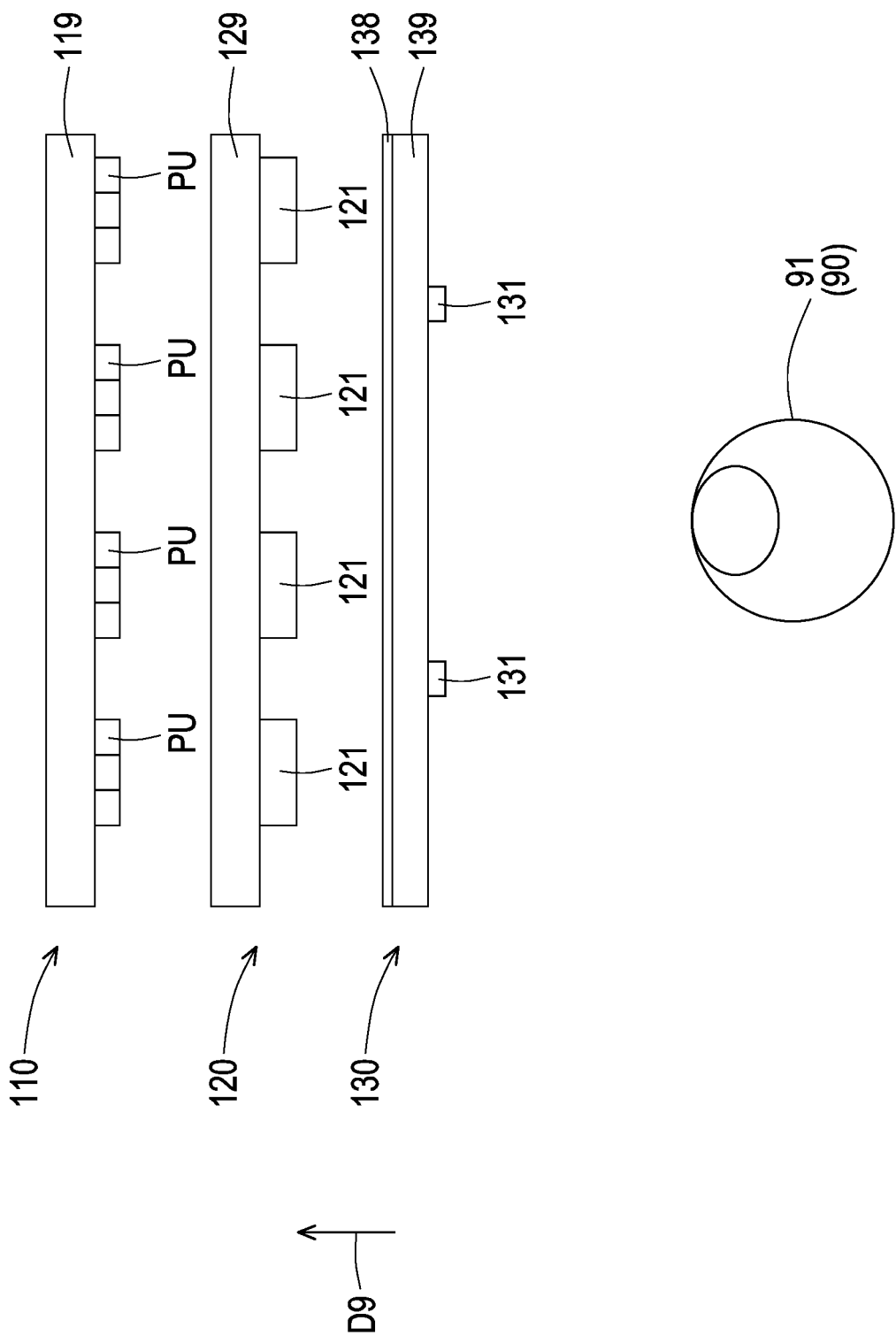

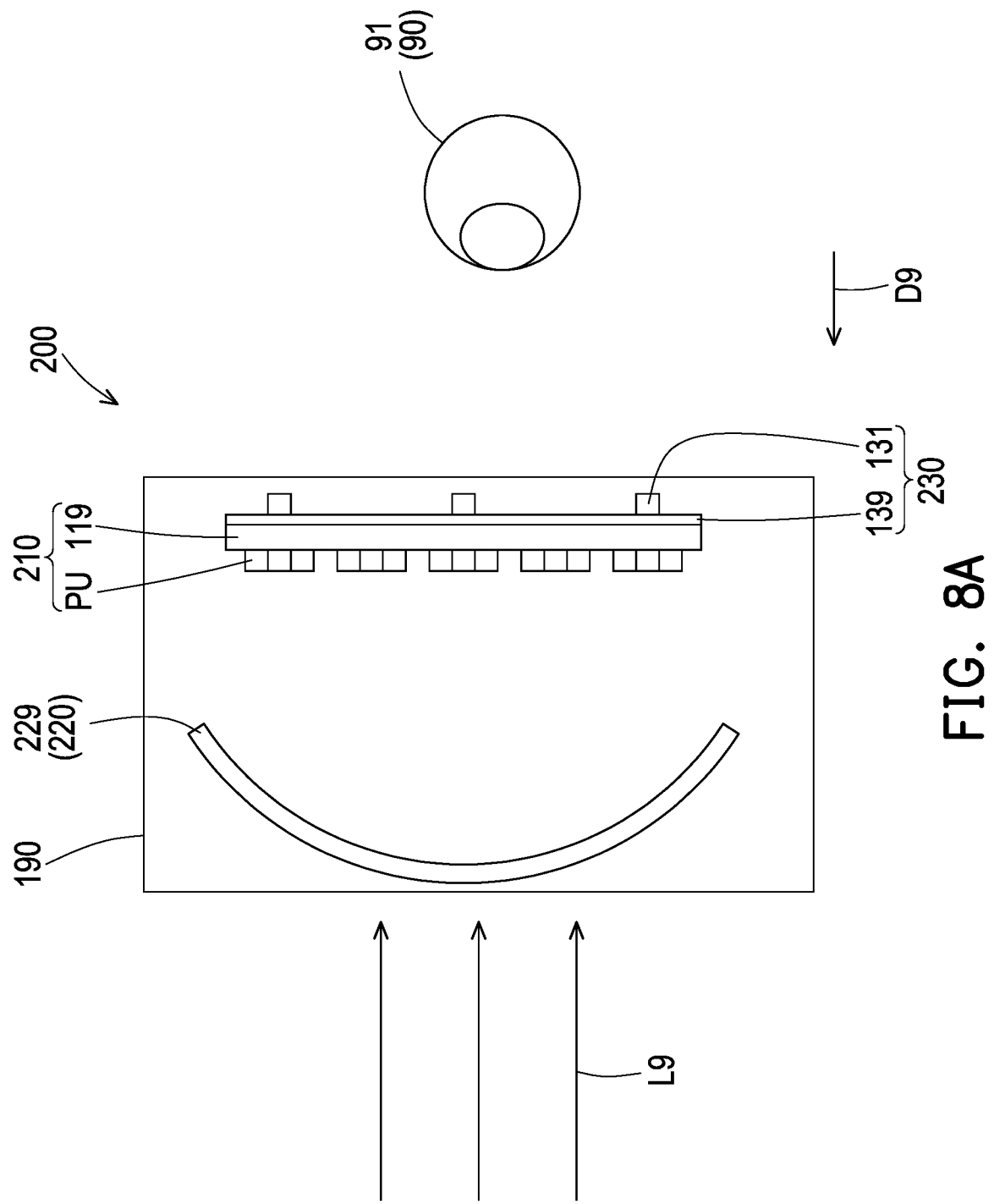

HEAD-MOUNTED AUGMENTED REALITY STEREO VISION OPTICAL FILM ON GLASSES

CROSS-REFERENCE TO RELATED APPLICATION

This application is a continuation-in-part application of and claims the priority benefit of U.S. application Ser. No. 17/563,105, filed on Dec. 28, 2021, which claims the priority benefit of Taiwan application serial no. 110146849, filed on Dec. 15, 2021. This application also claims the priority benefit of Taiwan application serial no. 111145301, filed on Nov. 25, 2022. The entirety of each of the above-mentioned patent applications is hereby incorporated by reference herein and made a part of this specification.

BACKGROUND

Technical Field

The disclosure relates to an imaging system, and more particularly to a head-mounted augmented reality stereo vision optical film on glasses.

Description of Related Art

In order to provide higher quality audio and video effects, technologies such as virtual reality (VR), augmented reality (AR), and mixed reality (MR) have become one of the research and development priorities of the new generation display technology, and the head-mounted augmented reality stereo vision optical film is one of the means to implement the technologies.

SUMMARY

The disclosure provides a head-mounted augmented reality stereo vision optical film, which can present corresponding stereo vision imaging.

The head-mounted augmented reality stereo vision optical film of the disclosure includes a light transmitting display layer, an optical projection layer, and an eye tracking layer. The light transmitting display layer has multiple pixel units and a light shielding layer corresponding to the pixel unit. The optical projection layer has multiple light guide units. The light guide unit corresponds to the pixel units. The eye tracking layer has multiple light emitting elements and micro sensing elements. In a viewing direction of a wearer, the optical projection layer is located between the light transmitting display layer and the eye tracking layer.

In order for the features and advantages of the disclosure to be more comprehensible, the following specific embodiments are described in detail in conjunction with the drawings.

BRIEF DESCRIPTION OF THE DRAWINGS

FIG. 2D is a schematic partial sectional view of a head-mounted augmented reality stereo vision optical film according to an embodiment of the disclosure.

FIG. 2E is a schematic partial sectional view of a head-mounted augmented reality stereo vision optical film according to an embodiment of the disclosure.

FIG. 3D is a schematic partial top view of a head-mounted augmented reality stereo vision optical film according to an embodiment of the disclosure.

FIG. 3E is a schematic partial top view of a head-mounted augmented reality stereo vision optical film according to an embodiment of the disclosure.

FIG. 3F is a schematic partial top view of a head-mounted augmented reality stereo vision optical film according to an embodiment of the disclosure.

FIG. 3G is a schematic partial top view of a head-mounted augmented reality stereo vision optical film according to an embodiment of the disclosure.

FIG. 3H is a schematic partial top view of a head-mounted augmented reality stereo vision optical film according to an embodiment of the disclosure.

FIG. 4A is a schematic partial side view of a head-mounted augmented reality stereo vision optical film according to an embodiment of the disclosure.

FIG. 6A is a schematic partial side view of a head-mounted augmented reality stereo vision optical film according to an embodiment of the disclosure.

FIG. 6B is a schematic partial side view of a head-mounted augmented reality stereo vision optical film according to an embodiment of the disclosure.

FIG. 8A is a schematic side view of a head-mounted augmented reality stereo vision optical film and an application manner thereof according to an embodiment of the disclosure.

DETAILED DESCRIPTION OF DISCLOSED EMBODIMENTS

Figure 1A:
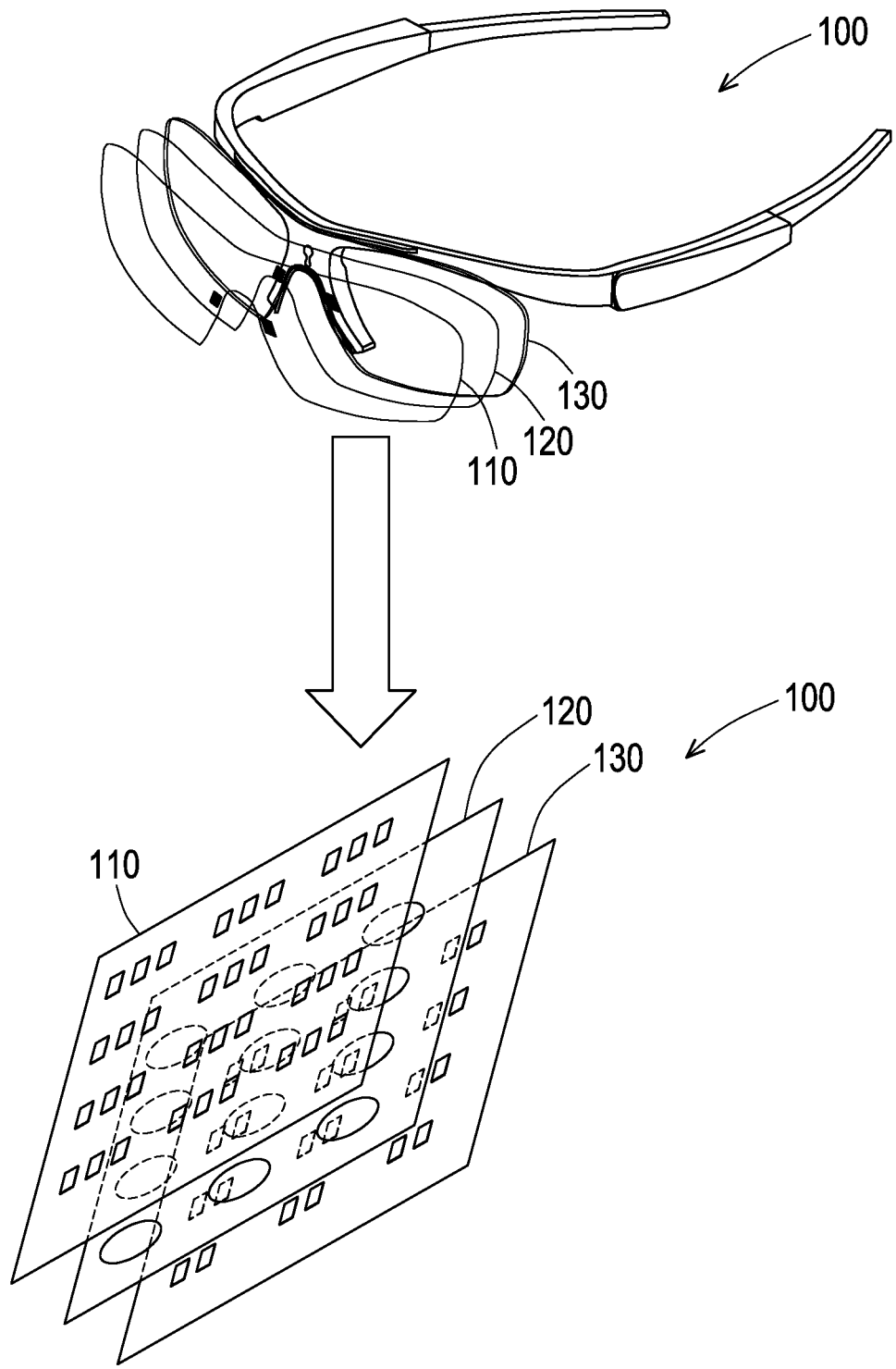
FIG. 1A is a schematic perspective view of a head-mounted augmented reality stereo vision optical film and an application manner thereof according to an embodiment of the disclosure.

In the drawings, the sizes of some elements, films, or layers may be enlarged or reduced for clarity. In addition, some elements, films, or layers may be omitted from being depicted or labeled in the drawings for clarity. Also, a value expressed in the specification may include the value and deviation values within the range of deviation acceptable to persons skilled in the art.

In the embodiments to be described later or the corresponding drawings, the same or similar components are denoted by the same or similar reference numerals and have the same or similar functions, and the description is omitted. In addition, not all elements, films, or layers are labeled or depicted in the drawings for clarity.

Figure 1B:
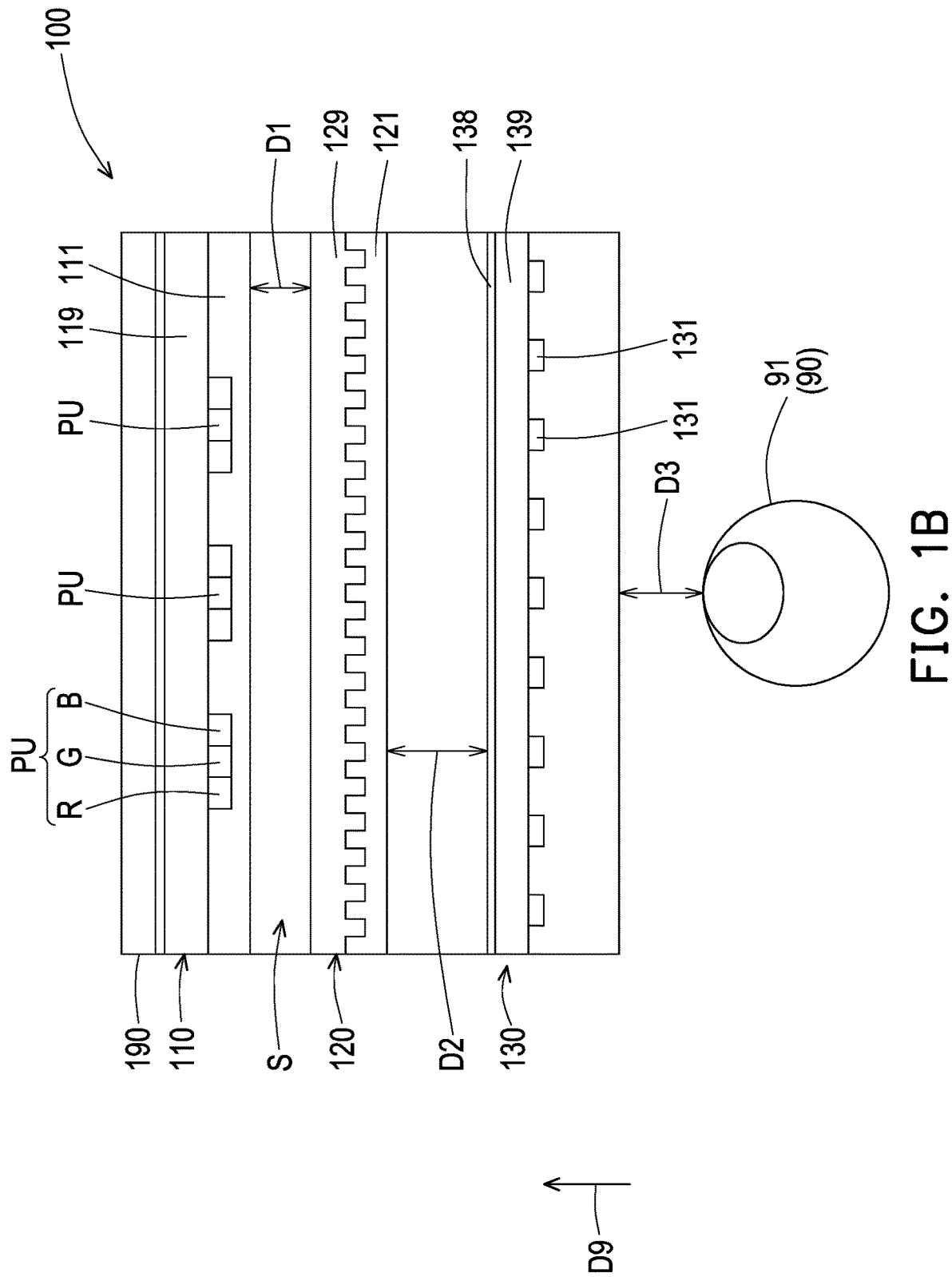
FIG. 1B is a schematic side view of a head-mounted augmented reality stereo vision optical film and an application manner thereof according to an embodiment of the disclosure.

Referring to FIG. 1A and FIG. 1B, a head-mounted augmented reality stereo vision optical film 100 may be adapted to be integrated with glasses. Therefore, a wearer 90 wears the glasses having the head-mounted augmented reality stereo vision optical film 100 integrated thereon, and viewing from a viewing direction D9 can generate an augmented reality stereo vision effect. Therefore, the head-mounted augmented reality stereo vision optical film 100 may also be referred to as a head-mounted augmented reality stereo vision optical film on glasses.

Please continue to refer to FIG. 1A and FIG. 1B. The head-mounted augmented reality stereo vision optical film 100 includes a light transmitting display layer 110, an optical projection layer 120, and an eye tracking layer 130, and the three layers are stacked on each other. The light transmitting display layer 110 has multiple pixel units PU. The optical projection layer 120 has multiple light guide units 121. One of the light guide units 121 is configured corresponding to at least one of the pixel units PU. The eye tracking layer 130 has multiple micro sensing elements 131.

In an embodiment, the light guide unit 121 may include a reflecting member, a refractive member, and/or other suitable light guide members. For example, the light guide unit 121 may include a lens. For example, the light guide unit 121 may be a metalens or a metasurface having a nanostructure. In an embodiment, the material of the light guide unit 121 may include gallium nitride (GaN), silicon nitride (SiN), or titanium dioxide ($TiO_2$), but the disclosure is not limited thereto.

In an exemplary application, the head-mounted augmented reality stereo vision optical film 100 may be applied to smart glasses, virtual reality equipment, augmented reality equipment, mixed reality equipment, etc., but the disclosure is not limited thereto.

In the embodiment, in the viewing direction D9 of the wearer 90, the optical projection layer 120 is located between the light transmitting display layer 110 and the eye tracking layer 130, but the disclosure is not limited thereto.

In the embodiment, there is a first distance D1 between the light transmitting display layer 110 and the optical projection layer 120, there is a second distance D2 between the optical projection layer 120 and the eye tracking layer 130, there is a viewing distance D3 between the head-mounted augmented reality stereo vision optical film 100 and an eyeball 91, and the viewing distance D3 may be greater than the first distance D1 or the second distance D2.

In an embodiment, the first distance D1 or the second distance D2 may be less than 5 centimeters (cm) or in a fully fitted state. The viewing distance D3 may be adjusted according to the habit of the wearer 90, which is not limited in the disclosure and is difficult to limit. The recommended viewing distance D3 is at least 1 cm to 3 cm.

In an embodiment, two opposite sides of the optical projection layer 120 may be respectively in contact with the light transmitting display layer 110 and the eye tracking layer 130. In other words, the first distance D1 and the second distance D2 are basically 0 cm.

In an embodiment, the optical projection layer 120 and the light transmitting display layer 110 may be fitted to be in contact with each other by an adhesive layer on the optical projection layer 120 and/or an adhesive layer on the light transmitting display layer 110. Similarly, the optical projection layer 120 and the eye tracking layer 130 may be fitted to be in contact with each other by the adhesive layer on the optical projection layer 120 and/or the adhesive layer on the eye tracking layer 130. However, the disclosure is not limited thereto.

In an embodiment, the light transmitting display layer 110, the optical projection layer 120, and the eye tracking layer 130 may be in close contact with each other by sealants located on sides thereof.

For example, the light transmitting display layer 110, the optical projection layer 120, and the eye tracking layer 130 may be fitted to each other and fixed on a frame 190. The fitting process requires precise alignment and gluing, but the disclosure is not limited thereto. In other words, as for the glasses having the head-mounted augmented reality stereo vision optical film 100 integrated thereon, the rough visual appearance thereof may be the same as or similar to general glasses to be more adapted to be worn and/or used by the wearer 90.

In an embodiment, the form or the material of the frame 190 may be adjusted according to design requirements, which is not limited in the disclosure. The frame 190 may be integrally formed or a combination of multiple components, which is not limited in the disclosure.

In the embodiment, the light transmitting display layer 110 may further include a substrate 119. The substrate 119 may include a light transmitting substrate. The substrate 119 may include a hard substrate (for example, glass or hard plastic, but not limited thereto) or a soft substrate (for example, a polyimide (PI) film, a polyethylene terephthalate (PET) film, or other similar polymer films, but not limited thereto), wherein the substrate includes a circuit driving structure of a display layer, which may be a low temperature poly-silicon thin film transistor (LTPS-TFT), a mini driver integrated circuit (IC), etc. The pixel unit PU may be configured on the substrate 119, and the pixel unit PU on the substrate 119 may face the wearer 90.

In an embodiment, each pixel unit PU may include a corresponding first subpixel unit R, second subpixel unit G, and third subpixel unit B.

Figure 2A:
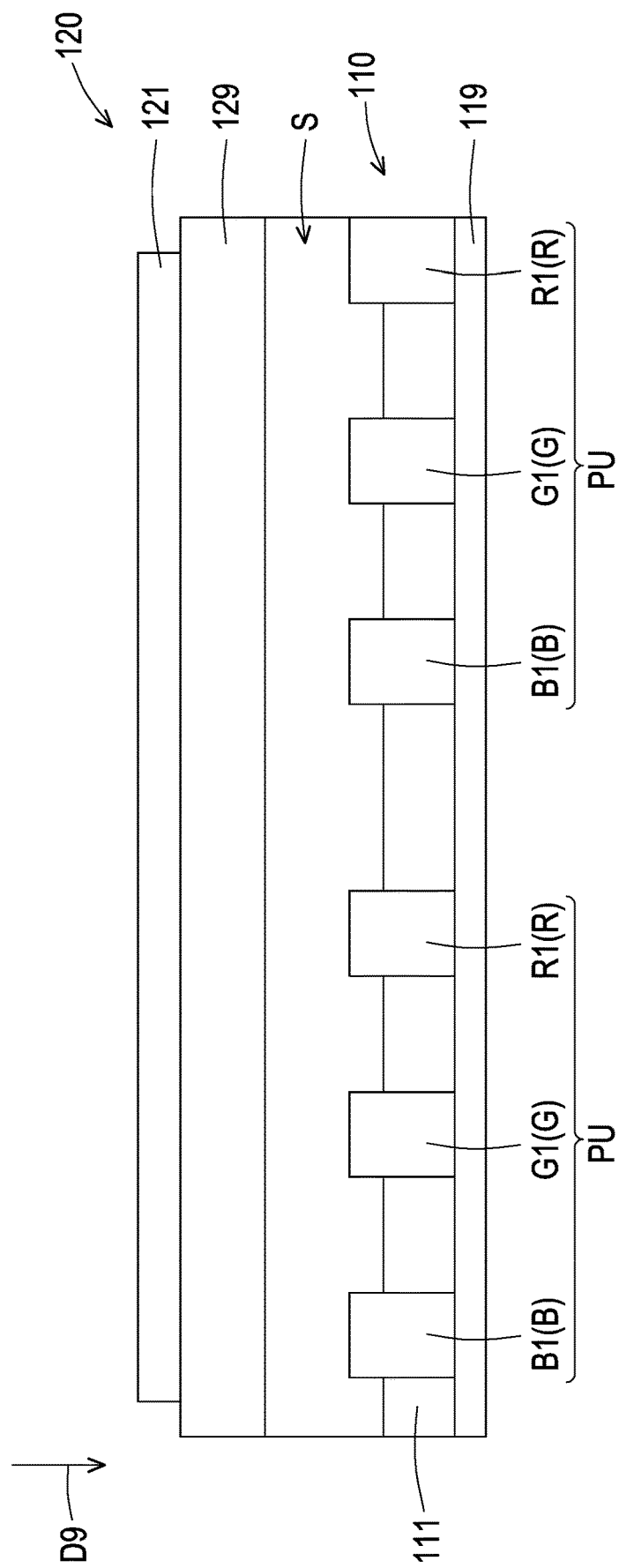
FIG. 2A is a schematic partial side view of a head-mounted augmented reality stereo vision optical film according to an embodiment of the disclosure.

As shown in FIG. 2A, in an embodiment, the first subpixel unit R may include a red light emitting diode R1, the second subpixel unit G may include a green light emitting diode G1, and the third subpixel unit B may include a blue light emitting diode B1, but the disclosure is not limited thereto.

In an embodiment, an optical encapsulation layer 111 may be provided between the light emitting diodes, but the disclosure is not limited thereto.

In an embodiment, the forming manner of the first subpixel unit R, the second subpixel unit G, or the third subpixel unit B may include color conversion, nanorod, etc. as known to persons skilled in the art.

In an embodiment, the light emitting diode (for example, the light emitting diode B1, R1, or G1) may include a micro light emitting diode (μLED) with a size of basically (5 micrometers (μm) to 100 μm)×(5 μm to 100 μm), but the disclosure is not limited thereto. The light emitting diode (not limited in size or color) may be one type of the light emitting element 112.

In an embodiment, the light transmitting display layer 110 may further include an element layer (not shown). The element layer may be located on the substrate 119. The element layer may include a driving circuit and/or a corresponding wiring. The driving circuit may include a corresponding active element (for example, a thin film transistor) and/or a corresponding passive element (for example, a capacitor). The light emitting diode may be electrically connected to the corresponding wiring by an appropriate manner (for example, flip-chip bonding, but not limited thereto) and may be further electrically connected to the driving circuit by the corresponding wiring.

In an embodiment, the substrate 119 may include a circuit board. For example, the substrate 119 may include a thin film transistor (TFT) array substrate.

In an embodiment, the driving circuit may be electrically connected to a control unit 140 (labelled in FIG. 4A or FIG. 4B) by the corresponding wiring. In this way, the light emitting diode may be controlled by the corresponding control unit 140 to emit light, but the disclosure is limited thereto.

In an embodiment, a region S between the light transmitting display layer 110 and the optical projection layer 120 may have an adhesive layer, an air gap, and/or a pixel light shielding layer, but the disclosure is not limited thereto.

Figure 2B:
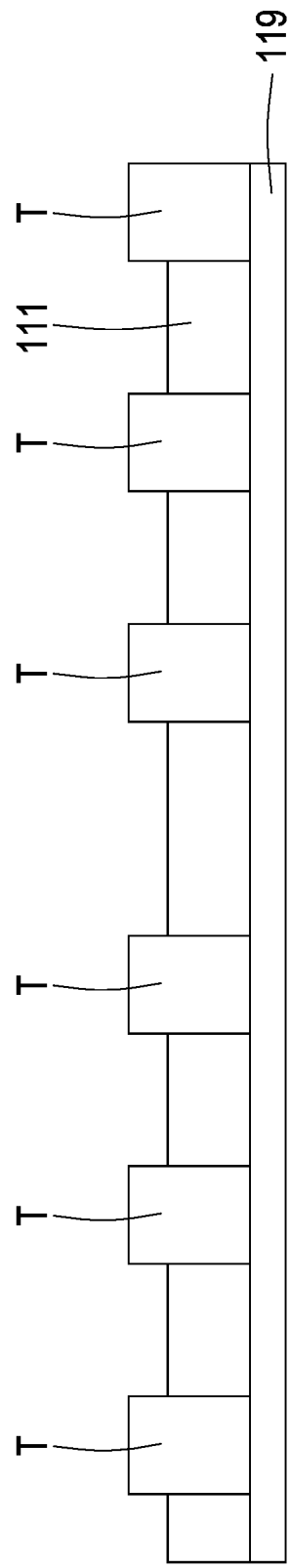
FIG. 2B is a schematic partial side view of a head-mounted augmented reality stereo vision optical film according to an embodiment of the disclosure.

As shown in FIG. 2B, in an embodiment, each pixel unit PU may include a corresponding light emitting element T (one type of the light emitting element 112). In an embodiment, a certain light emitting element T may have different corresponding light emitting colors in different states by dynamic pixel tuning. For example, the light emitting wavelength of the light emitting element T may be correspondingly shifted (for example, blue shift) by adjusting the current flowing through the light emitting element T. In this way, each pixel unit PU is not limited to have only a single color light.

Figure 2C:
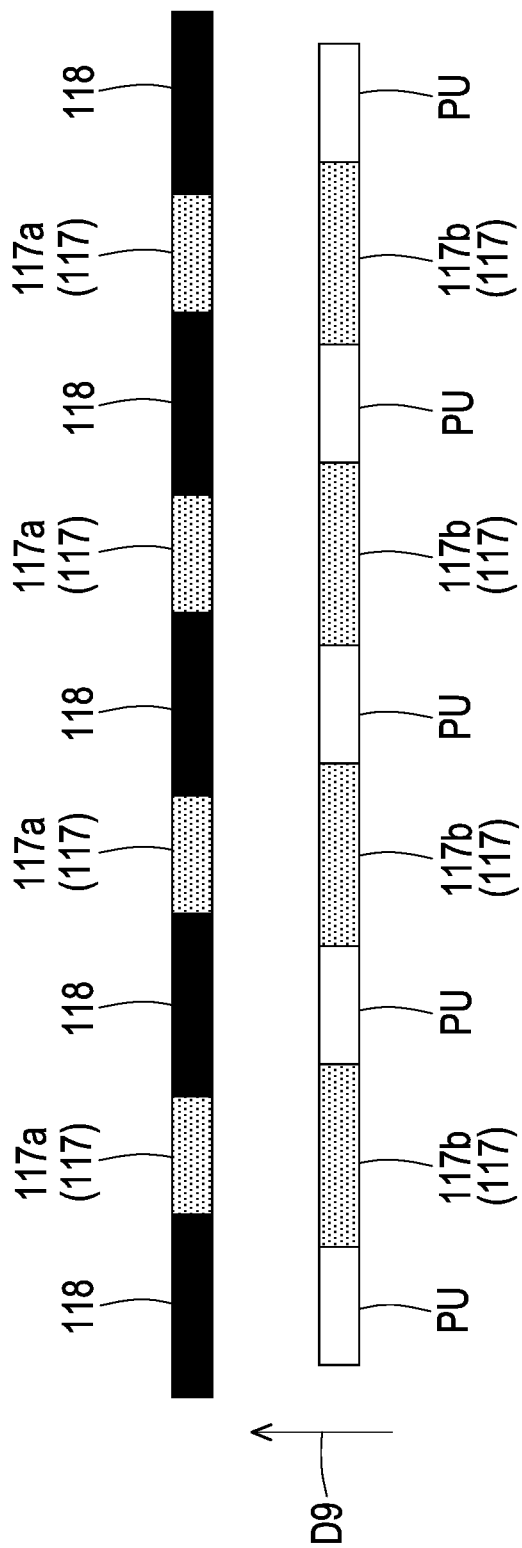
FIG. 2C is a schematic partial side view of a head-mounted augmented reality stereo vision optical film according to an embodiment of the disclosure.

Referring to FIG. 2C, in an embodiment, the light transmitting display layer 110 may further include a light shielding layer (also referred to as a first light shielding layer) 118 corresponding to the pixel unit PU. In the viewing direction D9 of the wearer 90, the light shielding layer 118 may overlap with the pixel unit PU. In other words, in the viewing direction D9 of the wearer 90, the pixel unit PU may be located between the eyeball 91 of the wearer 90 and the light shielding layer 118. In an embodiment, when the wearer 90 is viewing, the light shielding layer 118 may reduce the intensity of the external light and/or may reduce the visual discomfort of the wearer 90 caused by light mixing between the external light and the pixel unit PU. In this way, the viewing quality of the head-mounted augmented reality stereo vision optical film 100 can be improved.

In an embodiment, the light shielding layer 118 may be in direct contact with the pixel unit PU (that is, the distance is 0). In an embodiment, there may be a corresponding spacing between the light shielding layer 118 and the pixel unit PU (that is, the distance is greater than 0). For example, the light shielding layer 118 and the pixel unit PU may be respectively disposed on two sides of the substrate 119, and the pixel unit PU is disposed between the wearer 90 and the light shielding layer 118.

Referring to FIG. 2C, in an embodiment, viewing from the viewing direction D9 of the wearer 90, a metasurface region 117 may be provided between the pixel units PU. The metasurface region 117 is, for example, a region correspondingly formed by performing metasurface processing on an element (for example, a film layer, but not limited thereto) or a region having a metasurface structure. In an embodiment, the metasurface region 117 may transmit light. For example, the metasurface region 117 may at least partially transmit the external light. In an embodiment, the metasurface region 117 may reduce the diffraction phenomenon of the external light, so as to improve the viewing quality of the head-mounted augmented reality stereo vision optical film 100.

In an embodiment, on a cross-section (for example, the cross-section shown in FIG. 2C), a metasurface region 117a (one type of the metasurface region 117) may be located between the light shielding layers 118. For example, the distance between the metasurface region 117a and the wearer 90 may be the same or similar to the distance between the light shielding layer 118 and the wearer 90. In an embodiment, on a cross-section (for example, the cross-section shown in FIG. 2C), a metasurface region 117b (one type of the metasurface region 117) may be located between the pixel units PU. For example, the distance between the metasurface region 117b and the wearer 90 may be the same or similar to the distance between the pixel unit PU and the wearer 90. In an embodiment, the light shielding layer 118 may be configured corresponding to the pixel unit PU, and the metasurface region 117a and the metasurface region 117b may be present at the same time.

In an embodiment, the light transmitting display layer 110 may further include a light shielding layer (also referred to as a second light shielding layer) 113 having a pinhole. Viewing from the viewing direction D9 of the wearer 90, the light shielding layer 113 is located between the light emitting element 112 and the wearer 90. The pinhole of the light shielding layer 113 may correspond to the light emitting element 112. In other words, light emitted by the light emitting element 112 may be transmitted to the wearer 90 through the pinhole of the light shielding layer 113.

Referring to FIG. 2D, in the embodiment, a light shielding layer 113D (which may be one type of the light shielding layer 113) may be configured corresponding to the light emitting element 112. For example, the light shielding layer 113D may be a light shielding layer having a pinhole 113Da. The light shielding layers 113D may be separated from each other, and the pinhole 113Da of each light shielding layer 113D may be configured corresponding to each light emitting element 112.

In an embodiment, in the same direction, the ratio of the aperture of the pinhole 113Da to the size of the corresponding light emitting element 112 may be between 3% and 50%. In an embodiment, the aperture of the pinhole 113Da may be between 0.5 μm and 10 μm.

In an embodiment, the material of the light shielding layer 113D may include a light shielding insulating layer (for example, a dark-colored epoxy resin or other similar dark-colored polymers), a light shielding conductive layer (for example, a molybdenum layer or a graphite layer, but not limited thereto), a combination of the above, or a stack of the above.

In an embodiment, the light shielding layer having the pinhole may reduce the light mixing phenomenon between different subpixel units and/or improve light collimation, so as to improve the display quality.

In an embodiment, a light transmitting layer 114 may be provided between the light shielding layer 113D and the light emitting element 112. The material of the light transmitting layer 114 may include an optical clear adhesive (OCA). In an embodiment, the light transmitting layers 114 covering the light emitting elements 112 may be separated from each other, and the light shielding layer 113D may conformally cover the corresponding light transmitting layer 114.

It should be noted that the disclosure does not limit the light transmitting layer 114 to be a single film layer. In other words, the light transmitting layer 114 may be a single film layer or the light transmitting layer 114 may be a stack of multiple light transmitting film layers.

Referring to FIG. 2E, in the embodiment, a light shielding layer 113E (which may be one type of the light shielding layer 113) may be configured corresponding to the light emitting element 112. For example, the light shielding layer 113E may be a light shielding layer having multiple pinholes 113Ea. The light shielding layer 113E may be in a sheet shape, and each pinhole 113Ea of the light shielding layer 113E may be configured corresponding to each light emitting element 112.

In an embodiment, the material of the light shielding layer 113E may be the same as or similar to the light shielding layer 113D.

In an embodiment, the light shielding layer 113E and the substrate 119 may be located on two opposite sides of the light transmitting layer 114. In an embodiment, the light shielding layer 113E may be a planar film layer.

Figure 2F:
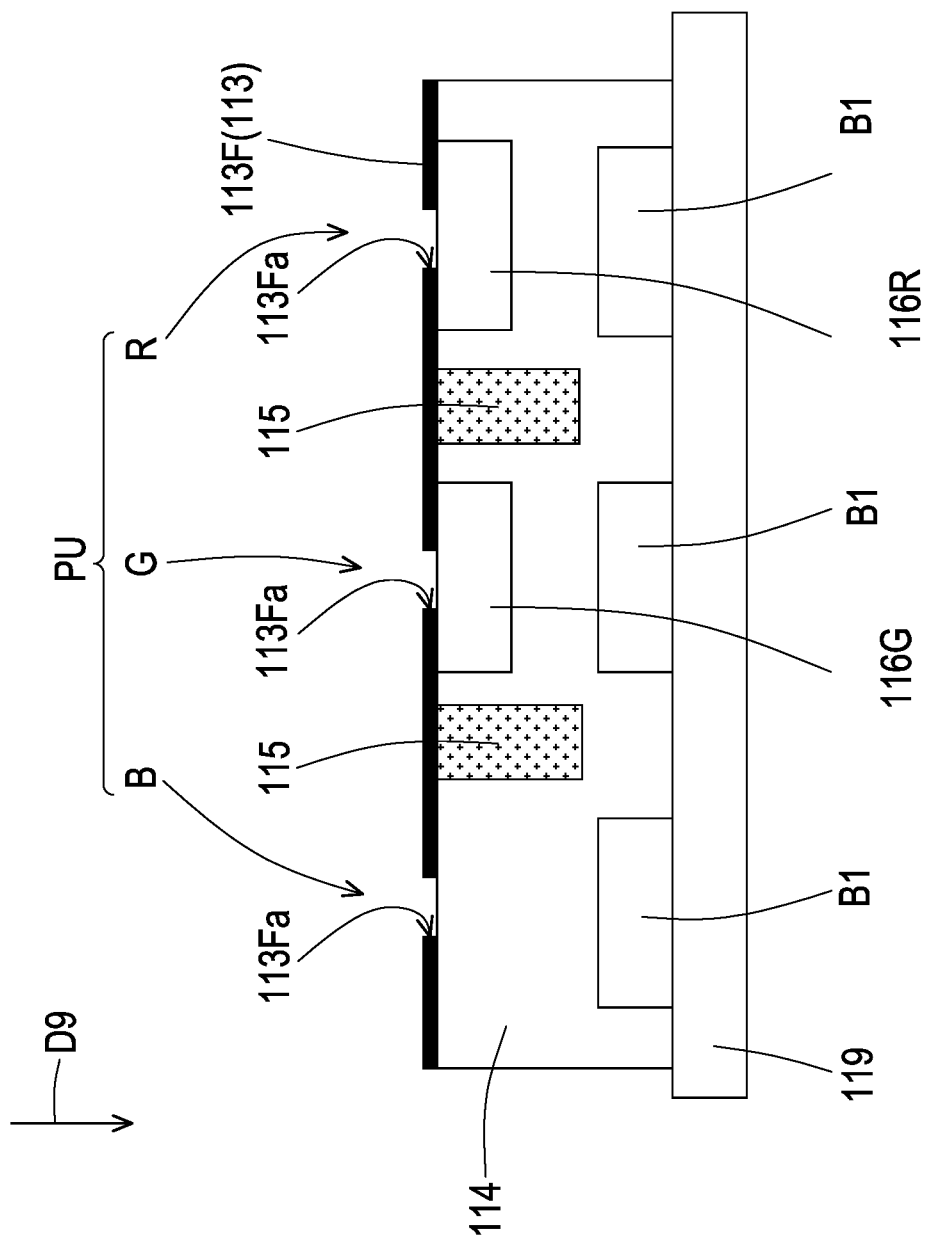
FIG. 2F is a schematic partial sectional view of a head-mounted augmented reality stereo vision optical film according to an embodiment of the disclosure.

Referring to FIG. 2F, in the embodiment, each pinhole 113Fa of a light shielding layer 113F may be configured corresponding to each light emitting diode B1 (one type of the light emitting element 112). A corresponding color conversion layer 116R may be provided between a certain pinhole 113Fa and the corresponding light emitting diode B1. A corresponding color conversion layer 116G may be provided between a certain pinhole 113Fa and the corresponding light emitting diode B1. The material of the color conversion layer 116R or the color conversion layer 116G may include a down conversion material or a quantum dot material. The first subpixel unit R may include the light emitting diode B1 and the corresponding color conversion layer 116R. The second subpixel unit G may include the light emitting diode B1 and the corresponding color conversion layer 116G. The third subpixel unit B may include the light emitting diode B1 that does not correspond to any color conversion layer.

In an embodiment, a corresponding light blocking structure 115 may be provided between the first subpixel unit R, the second subpixel unit G, and the third subpixel unit B two by two. The material of the light blocking structure 115 may include a light shielding insulating layer, a light shielding conductive layer, a combination of the above, or a stack of the above. In an embodiment, the light blocking structure 115 may reduce the light mixing phenomenon between different subpixel units, so as to improve the display quality.

Please continue to refer to FIG. 1A or FIG. 1B. In the embodiment, the optical projection layer 120 may further include a substrate 129. The substrate 129 may transmit light. The substrate 129 may include a hard substrate (glass, hard plastic, or sapphire, but not limited thereto), a soft substrate, or a corresponding visible light transmitting material with a high refractive index. The light guide unit 121 may be configured on the substrate 129.

In FIG. 3A to FIG. 3H or other similar drawings, only one or more types of the light guide units 121 are exemplarily shown, but the disclosure is not limited thereto. The light guide unit 121 may include a lens (for example, a Fresnel lens, a microlens, a metalens, other suitable lenses, or a combination of the above) or a light shielding layer having a pinhole, but the disclosure is not limited thereto. In other words, in FIG. 3A to FIG. 3H or other similar drawings, the size or the form of the light guide unit 121 may be an exemplary reference, and the disclosure does not limit the size, the material, or the form of each light guide unit 121 herein. In other words, as long as an element or a unit has an adjustable or changeable light shape or light angle or may improve light collimation, the same may be referred to as the light guide unit.

Figure 3A:
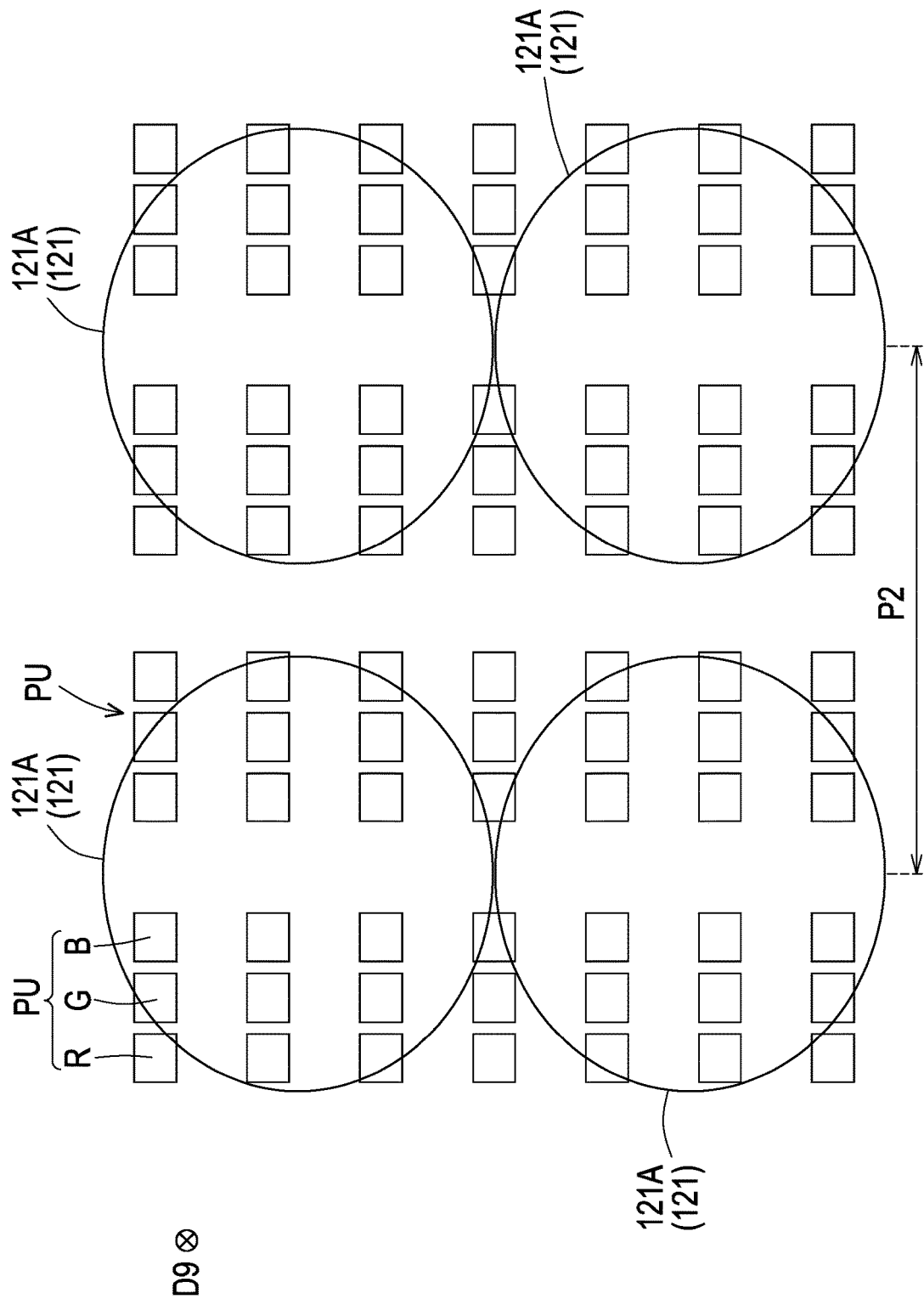
FIG. 3A is a schematic partial top view of a head-mounted augmented reality stereo vision optical film according to an embodiment of the disclosure.

Referring to FIG. 3A, in the embodiment, one light guide unit 121A (which may be one type of the light guide unit 121) is configured corresponding to multiple pixel units PU, but the disclosure is not limited thereto. In an embodiment, a light guide unit similar to the light guide unit 121A may be configured corresponding to one pixel unit PU. In addition, for the sake of clarity, not all of the pixel units PU are labelled one by one in FIG. 3A.

In an embodiment, the light guide unit (for example, the light guide unit 121A) that may be configured corresponding to multiple pixel units PU may be referred to as a Fresnel lens or a thread lens.

In an embodiment, the light guide unit 121A may be a combination of a microlens and a Fresnel lens. For example, the microlens may be configured on the corresponding pixel unit PU, and the Fresnel lens may be further configured on the corresponding microlens. In this way, light emitted by the pixel units PU may generate a corresponding image via the corresponding microlens. Then, light rays are deflected via the corresponding Fresnel lens and enter the eye. In other words, in a light path direction of the pixel unit PU, the microlens is located between the pixel unit PU and the Fresnel lens.

Figure 3C:
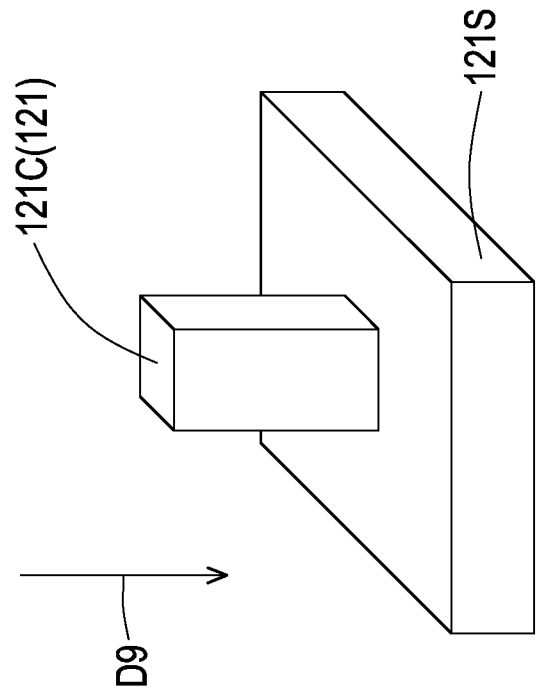
FIG. 3C is a schematic partial perspective view of a head-mounted augmented reality stereo vision optical film according to an embodiment of the disclosure.
Figure 3B:
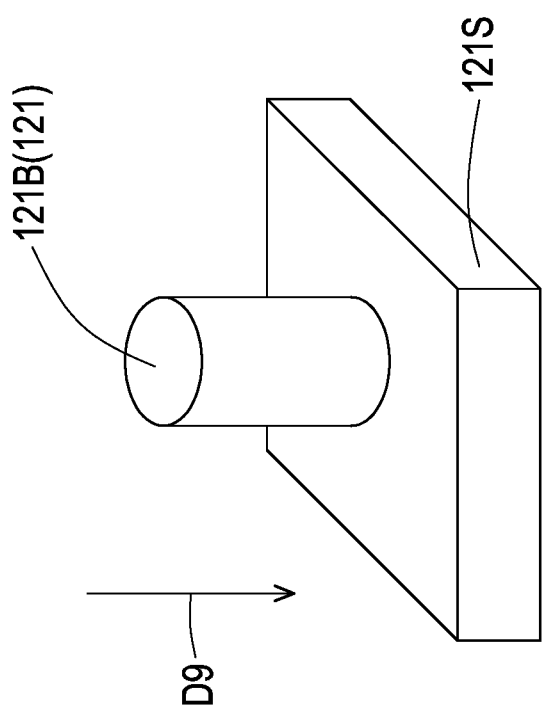
FIG. 3B is a schematic partial perspective view of a head-mounted augmented reality stereo vision optical film according to an embodiment of the disclosure.

Referring to FIG. 3B, in the embodiment, a light guide unit 121B (which may be one type of the light guide unit 121) may be configured corresponding to the light emitting element 112 (for example, the light emitting element T in the above drawing or the similar light emitting element 112 described later). For example, each light guide unit 121B may be configured corresponding to each light emitting element.

In an embodiment, the light guide unit 121B may be located on a light transmitting substrate 121S. For example, the light guide unit 121B may be a microstructure (for example, a nanostructure) formed on the light transmitting substrate 121S. For example, the corresponding microstructure may be formed on the light transmitting substrate 121S by a deposition process or an etching process. In an embodiment, the light transmitting substrate 121S may also be regarded as a part of the light guide unit.

In an embodiment, the material of the light guide unit 121B may include gallium nitride (GaN), silicon nitride (SiN), titanium dioxide ($TiO_2$), derivatives of the above, or a combination of the above. In an embodiment, the height of the light guide unit 121B (for example, the size in a direction perpendicular to the surface of the light emitting element 112 on which the light guide unit 121B is configured) may be between 300 nanometers (nm) and 1000 nm. In an embodiment, the width of the light guide unit 121B (for example, the maximum size in a direction parallel to the surface of the light emitting element 112 on which the light guide unit 121B is configured) may be less than half of the light emitting wavelength of the corresponding light emitting element 112.

In an embodiment, the appearance of the light guide unit 121B may be the same as or similar to a cylindrical shape.

In an embodiment, multiple light guide units 121B are arranged on the light transmitting substrate 121S. In an embodiment, the light guide units 121B may be arranged in an array on the light transmitting substrate 121S.

In an embodiment, the light guide unit 121B and the corresponding light transmitting substrate 121S may be referred to as a metalens.

Referring to FIG. 3C, in the embodiment, a light guide unit 121C (which may be one type of the light guide unit 121) may be configured corresponding to the light emitting element 112 (for example, the light emitting element T in the above drawing or the similar light emitting element 112 described later). For example, each light guide unit 121C may be configured corresponding to each light emitting element 112.

In an embodiment, the light guide unit 121C may be located on the light transmitting substrate 121S. For example, the light guide unit 121C may be a microstructure (for example, a nanostructure) formed on the light transmitting substrate 121S. In an embodiment, the light transmitting substrate 121S may also be regarded as a part of the light guide unit.

In an embodiment, the material, the height, and/or the width of the light guide unit 121C may be respectively the same as or similar to the material, the height, and/or the width of the light guide unit 121B.

In an embodiment, the appearance of the light guide unit 121C may be the same as or similar to a polygonal columnar shape. For example, the appearance of the light guide unit 121C may be the same as or similar to a square columnar shape.

In an embodiment, multiple light guide units 121C are arranged on the light transmitting substrate 121S. In an embodiment, the light guide units 121C may be arranged in an array on the light transmitting substrate 121S.

In an embodiment, the light guide unit 121C and the corresponding light transmitting substrate 121S may be referred to as a metalens.

Referring to FIG. 3D, in the embodiment, a light guide unit 121D (which may be one type of the light guide unit 121) may be configured corresponding to a light emitting element in a subpixel unit. For example, the red light emitting diode R1 of the first subpixel unit R, the green light emitting diode G1 of the second subpixel unit G, and the blue light emitting diode B1 of the third subpixel unit B are respectively configured with the corresponding light guide units 121D.

In the embodiment, the first subpixel unit R, the second subpixel unit G, and the third subpixel unit B may be sequentially arranged along a certain direction in an unlimited order.

Referring to FIG. 3E, in the embodiment, a light guide unit 121E (which may be one type of the light guide unit 121) may be configured corresponding to a light emitting element in a subpixel unit. For example, the red light emitting diode R1 of the first subpixel unit R, the green light emitting diode G1 of the second subpixel unit G, and the blue light emitting diode B1 of the third subpixel unit B are respectively configured with the corresponding light guide units 121E.

In the embodiment, the first subpixel unit R, the second subpixel unit G, and the third subpixel unit B may be arranged in a delta-type in an unlimited order.

Referring to FIG. 3F, in the embodiment, a light guide unit 121F (which may be one type of the light guide unit 121) may be configured corresponding to multiple light emitting elements in multiple subpixel units. For example, the red light emitting diode R1 of the first subpixel unit R, the green light emitting diode G1 of the second subpixel unit G, and the blue light emitting diode B1 of the third subpixel unit B are configured with the corresponding light guide units 121F.

In the embodiment, the first subpixel unit R, the second subpixel unit G, and the third subpixel unit B may be sequentially arranged along a certain direction in an unlimited order.

Referring to FIG. 3G, in the embodiment, a light guide unit 121G (which may be one type of the light guide unit 121) may be configured corresponding to multiple light emitting elements in multiple subpixel units. For example, the red light emitting diode R1 of the first subpixel unit R, the green light emitting diode G1 of the second subpixel unit G, and the blue light emitting diode B1 of the third subpixel unit B are configured with the corresponding light guide units 121G.

In the embodiment, the first subpixel unit R, the second subpixel unit G, and the third subpixel unit B may be arranged in a delta-type in an unlimited order.

Referring to FIG. 3H, in the embodiment, a light guide unit 121H (which may be one type of the light guide unit 121) may be configured corresponding to the light emitting element T of the pixel unit PU.

In the embodiment, the width of the light guide unit 121H (for example, the maximum size in a direction parallel to the surface of the light emitting element T on which the light guide unit 121H is configured) may be less than half of the minimum adjustable light emitting wavelength of the light emitting element T corresponding to the light guide unit 121H.

In an embodiment, the light guide unit 121D, the light guide unit 121E, the light guide unit 121F, the light guide unit 121G, and/or a light guide unit 121H may be referred to as metalens.

It should be noted that the disclosure does not limit the light guide unit 121 to be in direct contact with one or more corresponding light emitting elements 112. For example, the light guide unit 121 may be matched with and in direct contact with the one or more corresponding light emitting elements 112. For example, the light guide unit 121 may be matched with the one or more corresponding light emitting elements 112, and other film layers or elements (for example, OCA, but not limited thereto) may be provided between the light guide unit 121 and the one or more corresponding light emitting elements 112, and the light guide unit 121 is in indirect contact with the one or more corresponding light emitting elements 112.

It should be noted that the disclosure is not limited to the light guide unit 121 being only a single element when viewing in the viewing direction D9. In other words, the light guide unit 121 may be any of the above light guide elements or a combination or a stack of one or more of the above light guide elements when viewing in the viewing direction D9.

Please continue to refer to FIG. 1A or FIG. 1B. In an embodiment, an adhesive layer and/or an air gap may be provided between the optical projection layer 120 and the eye tracking layer 130, but the disclosure is not limited thereto.

Please continue to refer to FIG. 1B. In the embodiment, the eye tracking layer 130 may further include a substrate 139. The substrate 139 may transmit light. The micro sensing element 131 may be configured on the substrate 139. In addition, for the sake of clarity, not all of the micro sensing elements 131 are labelled one by one in FIG. 1A or FIG. 1B.

In an embodiment, the substrate 139 may include a hard substrate (for example, glass or hard plastic, but not limited thereto) or a soft substrate (for example, a PI film, a PET film, or other similar polymer films, but not limited thereto), but the disclosure is not limited thereto.

In an embodiment, the micro sensing element 131 may include a reverse-biased light emitting diode, a photodiode (PD), or a light sensing element under a flat optical layer with a diffraction pattern (for example, a mura mask, but not limited thereto). After a tracking beam is irradiated onto the eyeball 91 of the wearer 90, corresponding reflections may be generated in corresponding regions or directions according to corresponding eyeball tissues (for example, iris, pupil, lens, cornea, etc.). For example, under the irradiation of the tracking beam with basically the same light wavelength, the tissues of the eyeball may have light reflections in different directions and/or intensities at different positions. In this way, the movement of the eyeball 91 may be tracked by the micro sensing element 131 receiving the tracking beam (which may be referred to as a reflected beam) reflected via the eyeball 91 of the wearer 90.

In an embodiment, the size of the reverse-biased light emitting diode or the photodiode may be less than 250 μm×250 μm, but the disclosure is not limited thereto.

In an embodiment, a spacing P3 between two adjacent micro sensing elements 131 (that is, the distance between the midpoints of the two micro sensing elements 131) may be between 0.1 millimeters (mm) and 20 mm, but the disclosure is not limited thereto.

Figure 4B:
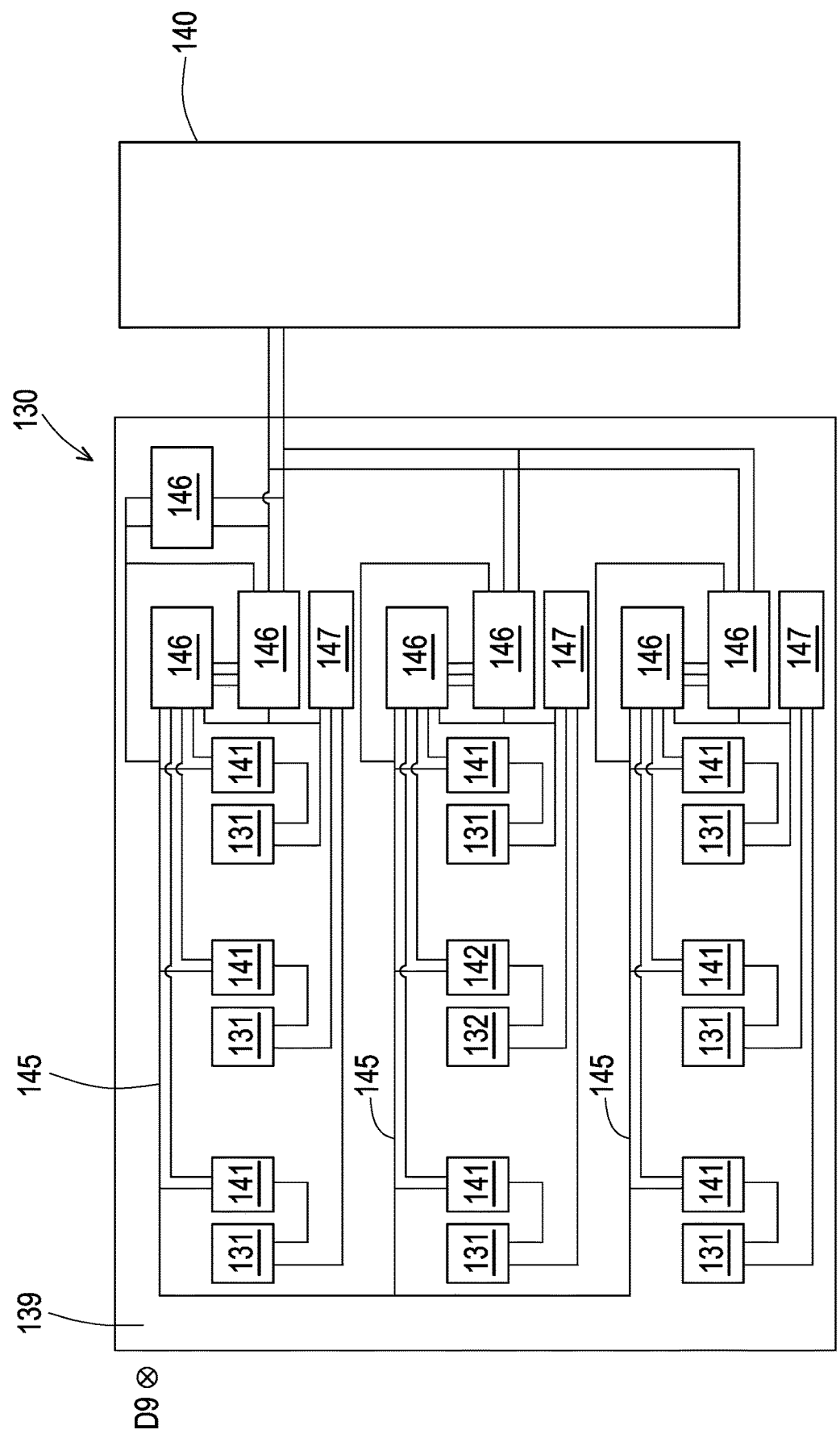
FIG. 4B is a schematic partial circuit view of a head-mounted augmented reality stereo vision optical film according to an embodiment of the disclosure.

In an embodiment, as shown in FIG. 4B, the tracking beam may be an active light source. For example, the eye tracking layer 130 may further include at least one light emitting element 132 configured on the substrate 139. The light emitting element 132 is adapted to emit the tracking beam directly or indirectly onto the eyeball 91 of the wearer 90. The tracking beam that may be emitted by the light emitting element 132 includes, for example, infrared light or other suitable light rays that are invisible to the wearer 90 and/or less damaging to the tissues of the eyeball 91. The luminous of the tracking beam may be adjusted according to design requirements and must comply with biosafety regulations, which is not limited in the disclosure.

As shown in FIG. 4A or FIG. 4B, in an embodiment, the eye tracking layer 130 may further include an element layer 133. The element layer 133 may be located on the substrate 139. The element layer 133 may include an emitter circuit 142, a sensor circuit 141, and/or a corresponding wiring 145.

As shown in FIG. 4B, in an embodiment, the emitter circuit 142 or the sensor circuit 141 may include a corresponding active element and/or a corresponding passive element. The emitter circuit 142 may be electrically connected to the micro light emitting element 132 by the corresponding wiring 145 and/or the sensor circuit 141 may be electrically connected to the micro sensing element 131 by the corresponding wiring 145.

It should be noted that the disclosure does not limit an element to substantially correspond to only one die. For example, an element may correspond to only one die or an element may include multiple dies connected in parallel and/or in series.

Figure 4C:
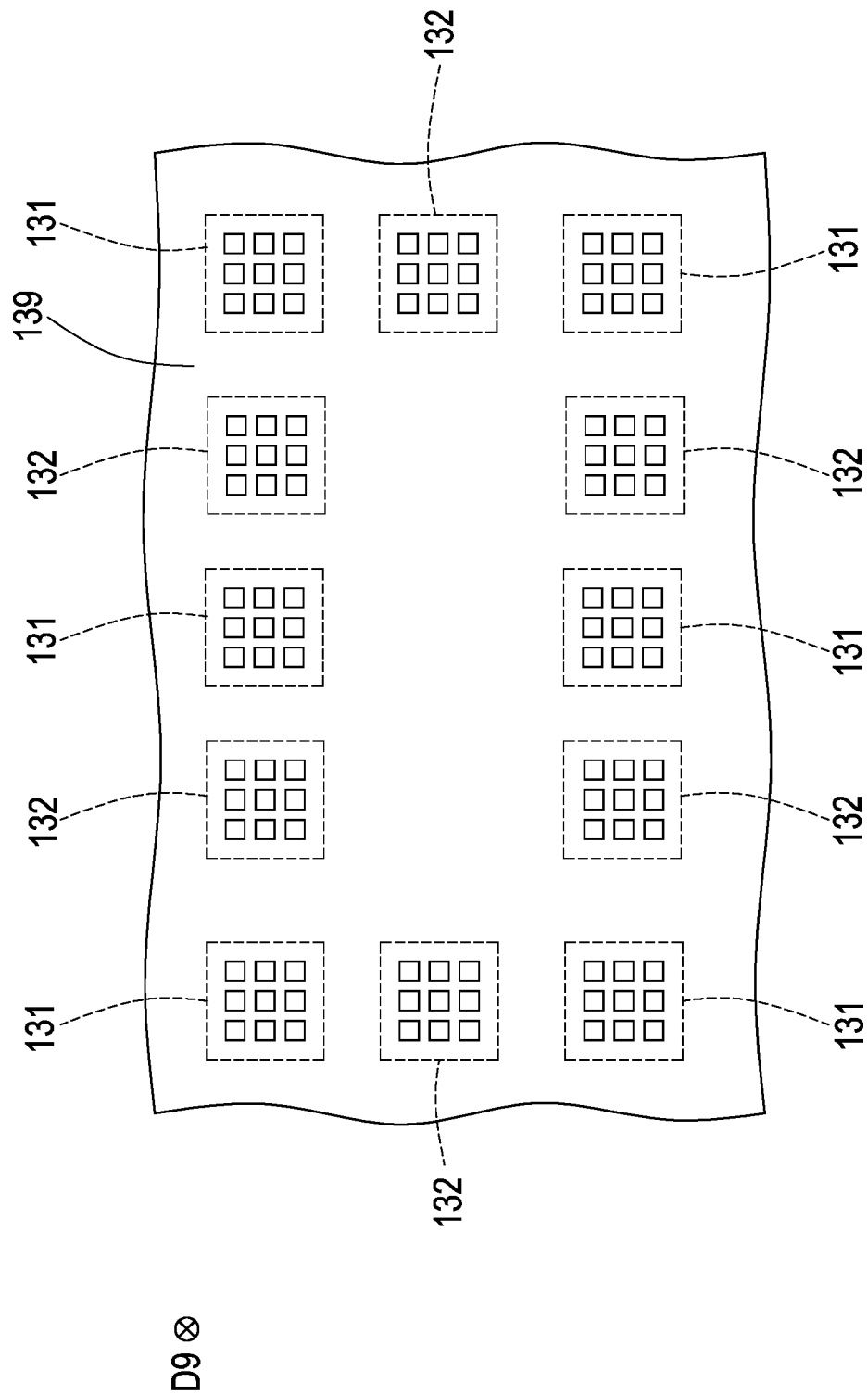
FIG. 4C is a schematic partial top view of a head-mounted augmented reality stereo vision optical film according to an embodiment of the disclosure.

As shown in FIG. 4C, in an embodiment, the sensing element 131 may include multiple dies and/or the light emitting element 132 may include multiple dies. In addition, FIG. 4C only exemplarily illustrates the configuration manner of the sensing element 131 or the light emitting element 132, but the disclosure does not limit the configuration manner.

It is worth noting that in some of the schematic side views (also referred to as cross-sectional views, such as FIG. 1B or FIG. 4A), the light emitting element 132 may not be shown. However, the light emitting element 132 may be seen in other side view directions or other cross-sections.

In an embodiment, the emitter circuit 142 and/or the sensor circuit 141 may be electrically connected to a corresponding chip 146 and/or terminal 147 by the corresponding wiring 145. The chip 146 may include a current IC, a voltage IC, an amplifier IC (AMP IC), an analog/digital conversion IC, or other suitable integrated circuits. Multiple of the above integrated circuits may be integrated into the same chip or may respectively belong to different chips. The terminal 147 may include a power terminal, a common terminal, or a ground terminal.

In an embodiment, the chip 146 and/or the terminal 147 may be electrically connected to the control unit 140 by the corresponding wiring 145. The control unit 140 may include an embedded system, a microcontroller (MCU), and/or an application specific integrated circuit (ASIC), but the disclosure is not limited thereto.

In an embodiment, the line width of the wiring 145 may be less than 10 μm and/or the material of the wiring 145 may include zinc oxide (ZnO), tin oxide (SnO), indium-zinc oxide (IZO), gallium-zinc oxide (GZO), zinc-tin oxide (ZTO), indium-tin oxide (ITO), other suitable light transmitting conductive materials, or other materials with good electrical conductivity such as gold, but the disclosure is not limited thereto.

In an embodiment, the eye tracking layer 130 may further include an anti-reflection coating layer 138, but the disclosure is not limited thereto. The anti-reflection coating layer 138 may be located on the substrate 139. The anti-reflection coating layer 138 may be a single film or layer or a stack of multiple films or layers, which is not limited in the disclosure.

Figure 5A:
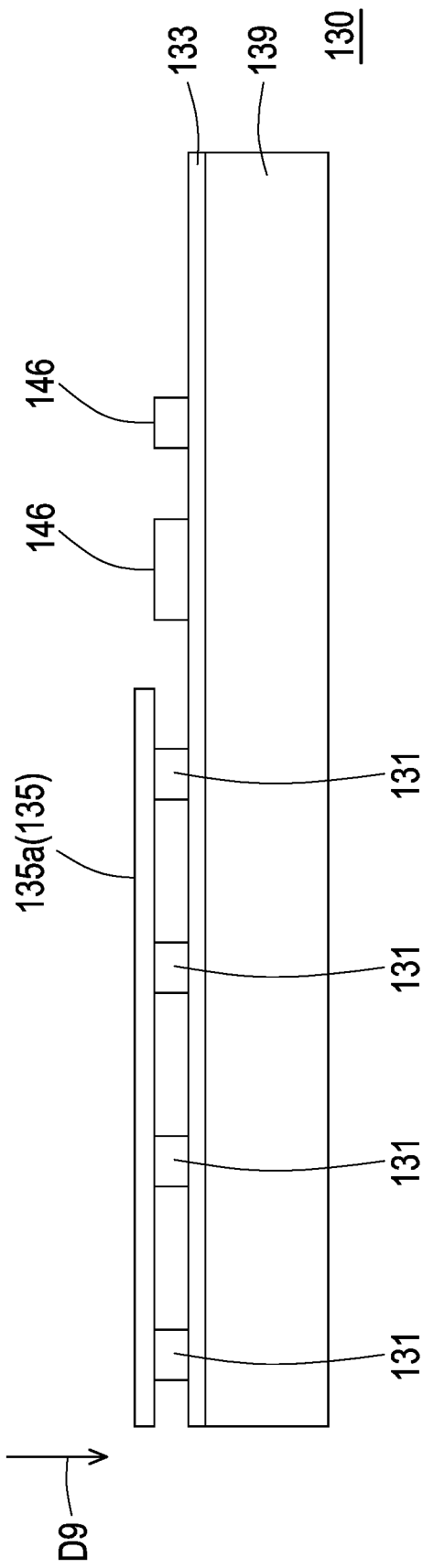
FIG. 5A is a schematic partial side view of a head-mounted augmented reality stereo vision optical film according to an embodiment of the disclosure.
Figure 5B:
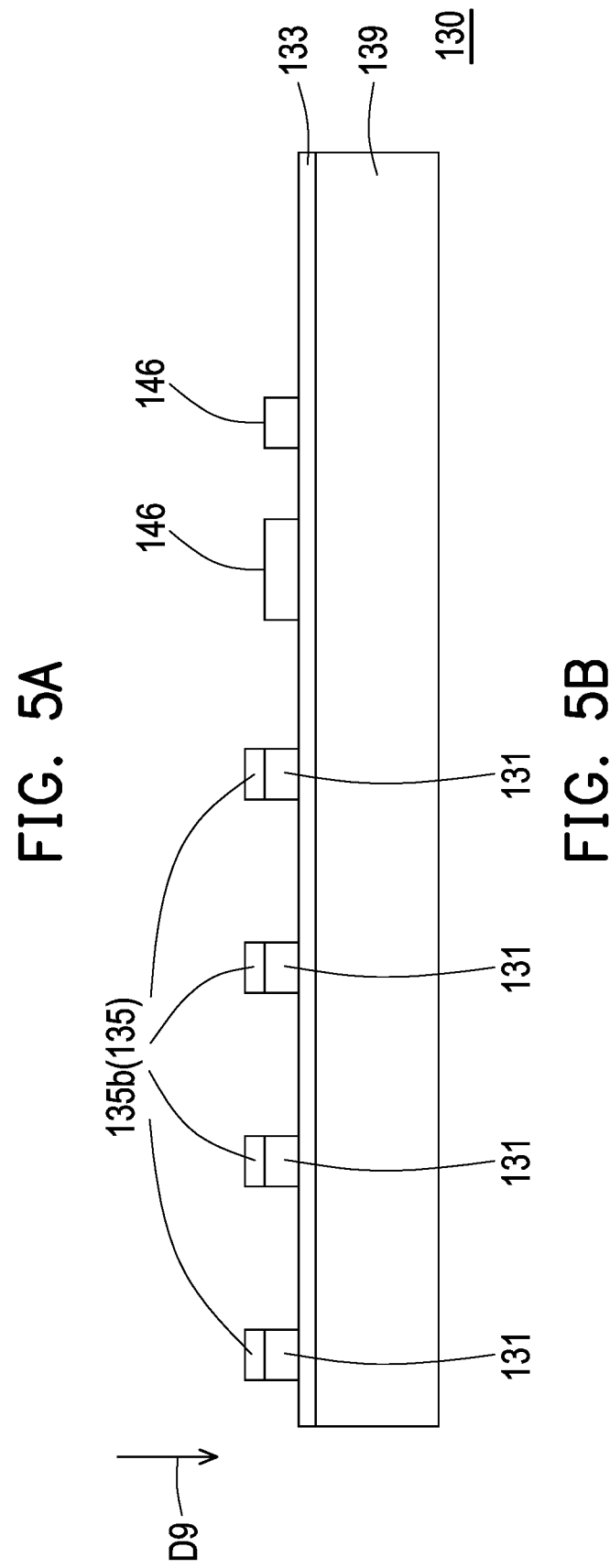
FIG. 5B is a schematic partial side view of a head-mounted augmented reality stereo vision optical film according to an embodiment of the disclosure.

In an embodiment, as shown in FIG. 5A or FIG. 5B, the eye tracking layer 130 may further include a light shape control layer 135. The light shape control layer 135 may cover the micro sensing element 131. The light shape control layer 135 may reduce a beam angle. In this way, the signal-to-noise ratio (SNR or S/N) of the micro sensing element 131 can be improved.

Taking FIG. 5A as an example, a light shape control layer 135a (one type of the light shape control layer 135) may be a sheet film or layer, and the light shape control layer 135a may cover multiple micro sensing elements 131.

Taking FIG. 5B as an example, a light shape control layer 135b (one type of the light shape control layer 135) may be patterned and/or separated films or layers, and each light shape control layer 135b may cover the corresponding micro sensing element 131.

In the embodiment, the micro sensing elements 131 are adapted to sense the eyeball 91 of the wearer 90. In addition, sensing signals of the micro sensing elements 131 may be operated by the control unit 140, so that the pixel units PU emit corresponding image beams. The image beam may be viewed by the wearer 90 after being guided by the light guide units 121. In addition, the image beam may basically correspond to a natural focus image of stereo vision of the human eye by the operation of the control unit 140. In other words, compared with conventional stereo vision images generated by using multiple polarizers to enable the left and right eyes of the viewer to respectively see light with different polarizations, in the head-mounted augmented reality stereo vision optical film 100 of the embodiment, the stereo vision images seen by the wearer 90 are more natural and/or the viewing process can be more comfortable.

In an embodiment, light emitted by the light emitting element 132 may generate corresponding reflected light after being irradiated onto the eyeball 91 of the wearer 90, and the reflected light may be sensed by the sensing element 132 to generate a corresponding electrical signal. By the electrical signal, the control unit 140 may detect and/or calculate the position or the movement of the eyeball 91 of the wearer 90 via an appropriate algorithm, so as to drive the light transmitting display layer 110 to generate a corresponding image (which, for example, includes but is not limited to, a dynamic visual adjustment and/or an eye box compensation effect). In this way, when the wearer 90 views by the head-mounted augmented reality stereo vision optical film 100, an augmented reality stereo vision effect can be generated.

In the embodiment, within a unit area range, the number of the micro sensing elements 131 is less than the number of the pixel units PU or the number of the light guide units 121. In an embodiment, within the unit area range, the number of the light guide units 121 is less than or equal to the number of the pixel units PU.

In an embodiment, within the unit area range, the number of the pixel units PU or the number of the light guide units 121 is far greater than the number of the micro sensing elements 131. For example, the number of the pixel units PU or the number of the light guide units 121 is at least 100 times more than the number of the micro sensing elements 131.

As shown in FIG. 6A, in an embodiment, in the viewing direction D9 of the wearer 90, the micro sensing element 131 may overlap with the pixel unit PU or the light guide unit 121, but the disclosure is not limited thereto.

As shown in FIG. 6B, in an embodiment, in the viewing direction D9 of the wearer 90, the micro sensing element 131 may not overlap with or be far away from the pixel unit PU or the light guide unit 121.

Figure 7:
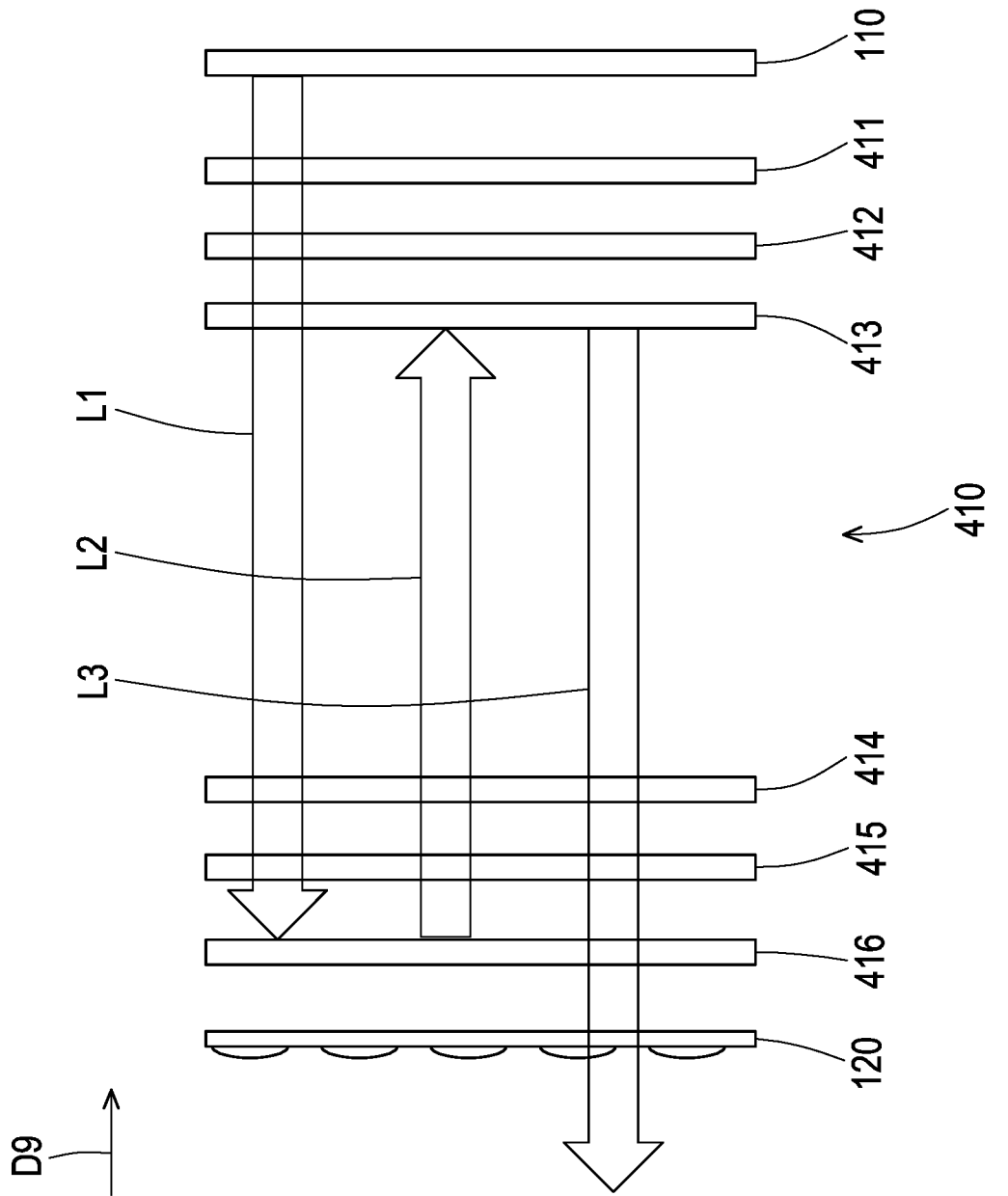
FIG. 7 is a schematic partial side view of a head-mounted augmented reality stereo vision optical film according to an embodiment of the disclosure.

FIG. 7 is a schematic partial side view of a head-mounted augmented reality stereo vision optical film according to an embodiment of the disclosure.

In an embodiment, the head-mounted augmented reality stereo vision optical film 100 may further include a folded light path system 410. The folded light path system 410 may include multiple reflecting films or reflecting sheets (for example, transflective films or reflecting polarizers) and/or multiple polarizing films or polarizing sheets, so that light rays are reflected at least multiple times therein, so as to generate multiple folded or overlapping light paths. As such, the visual depth of field can be increased and/or the thickness of the head-mounted augmented reality stereo vision optical film 100 can be reduced. In an embodiment, the folded light path system 410 may be referred to as a pancake optical system. In an embodiment, the folded light path system 410 may further include a corresponding refraction film, a refraction sheet, a filter film, or a filter sheet according to usage requirements, but the disclosure is not limited thereto.

For example, the folded light path system 410 may include a polarizer 411, a quarter-wave plate (QWP) 412, a beam splitter (BS) 413, a quarter-wave plate 414, and a polarization beam splitter (PBS) 416. The quarter-wave plate 414 and the polarization beam splitter 416 may be placed on a light transmitting substrate 415. Light passing through the light transmitting display layer 110 or light emitted from the light transmitting display layer 110 may generate multiple light paths L1, L2, and L3 in the folded light path system 410. The directions of the light path L1 and the light path L3 are basically the same, and the direction of the light path L2 is basically opposite to the light path L1 or the light path L3. It should be noted that the positions of the light paths L1, L2, and L3 in FIG. 7 are only schematically shown, and the disclosure is not limited to that shown in FIG. 7.

FIG. 8A is a schematic side view of a head-mounted augmented reality stereo vision optical film and an application manner thereof according to an embodiment of the disclosure.

In the embodiment, a head-mounted augmented reality stereo vision optical film 200 includes a light transmitting display layer 210, an optical projection layer 220, and an eye tracking layer 230. The light transmitting display layer 210 may be the same as or similar to the light transmitting display layer 110 of the above embodiment. The optical projection layer 220 may be similar to the optical projection layer 120 of the above embodiment. The eye tracking layer 230 may be the same as or similar to the eye tracking layer 130 of the above embodiment.

In the embodiment, in the viewing direction D9 of the wearer 90, the light transmitting display layer 210 is located between the optical projection layer 220 and the eye tracking layer 230.

In the embodiment, in the light transmitting display layer 210, the pixel unit PU on the substrate 119 may face the optical projection layer 220. A substrate 229 of the optical projection layer 220 may at least reflect light emitted by the pixel unit PU, so that the light reflected by the substrate 229 may be directed to the wearer 90.

In the embodiment, the substrate 229 may be a transflective substrate. For example, the substrate 229 may partially reflect the light emitted by the pixel unit PU, and the substrate 229 may partially allow an ambient light L9 to pass through.

In the embodiment, a surface of the substrate 229 facing the wearer 90 may include a curved surface.

In an embodiment, the optical projection layer 220 may not have a metalens having a nanostructure by the same or similar architecture as FIG. 8A. For example, in the same or similar architecture as in FIG. 8A, the substrate 229 may be used to reflect light rays, so that the optical projection layer 220 may omit the metalens having the nanostructure.

Figure 8B:
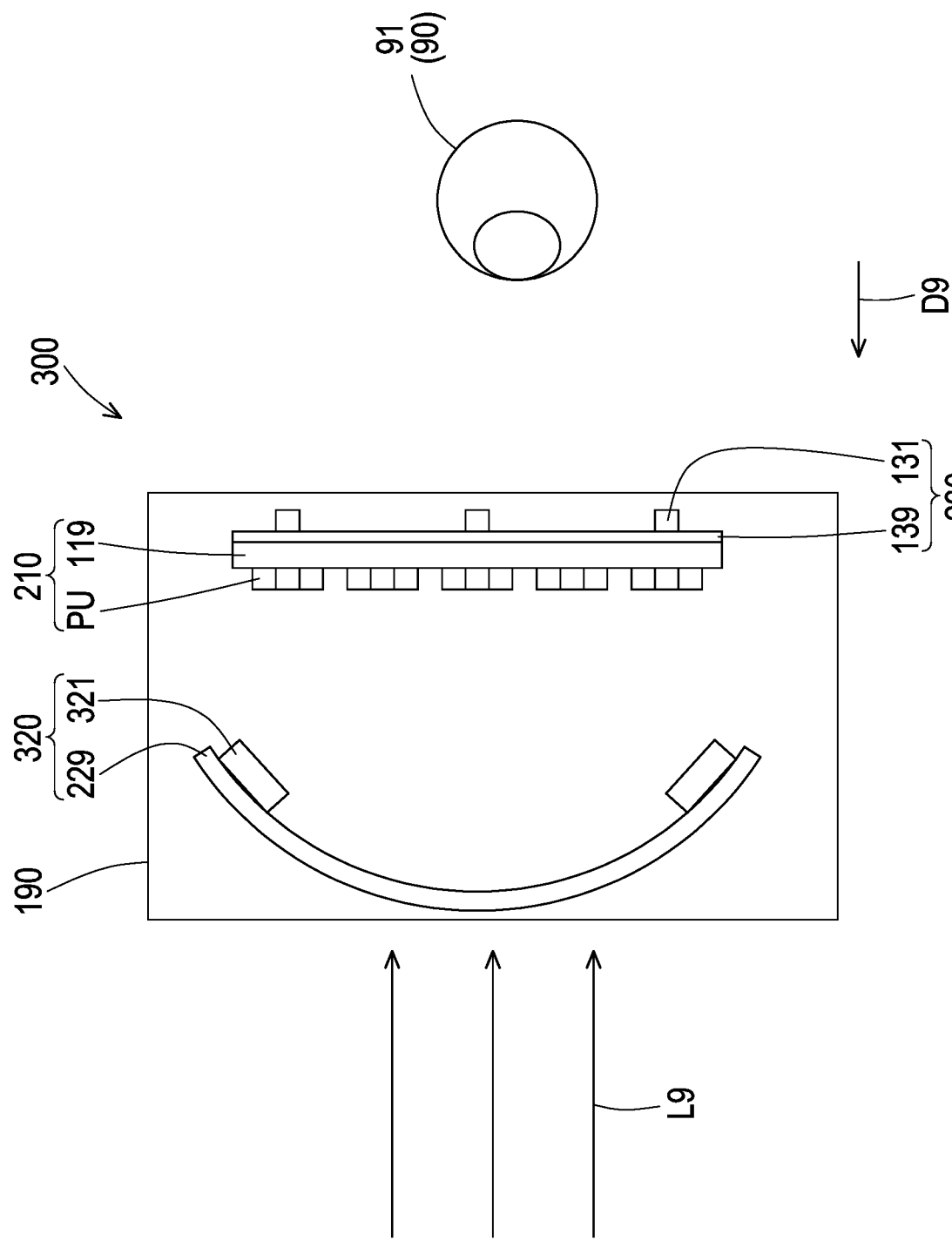
FIG. 8B is a schematic side view of a head-mounted augmented reality stereo vision optical film and an application manner thereof according to an embodiment of the disclosure.

FIG. 8B is a schematic side view of a head-mounted augmented reality stereo vision optical film and an application manner thereof according to an embodiment of the disclosure. The difference from the head-mounted augmented reality stereo vision optical film 200 in FIG. 8A lies in the setting of a metalens of an optical projection layer 320 in a head-mounted augmented reality stereo vision optical film 300.

In the embodiment, the optical projection layer 320 may further include an optical microstructure 321. The optical microstructure 321 may be configured on an edge of the substrate 229. The optical microstructure 321 can reduce visual parallax.

In an embodiment, the optical microstructure 321 may be a metalens or a metasurface having a nanostructure, but the disclosure is not limited thereto.

Figure 8C:
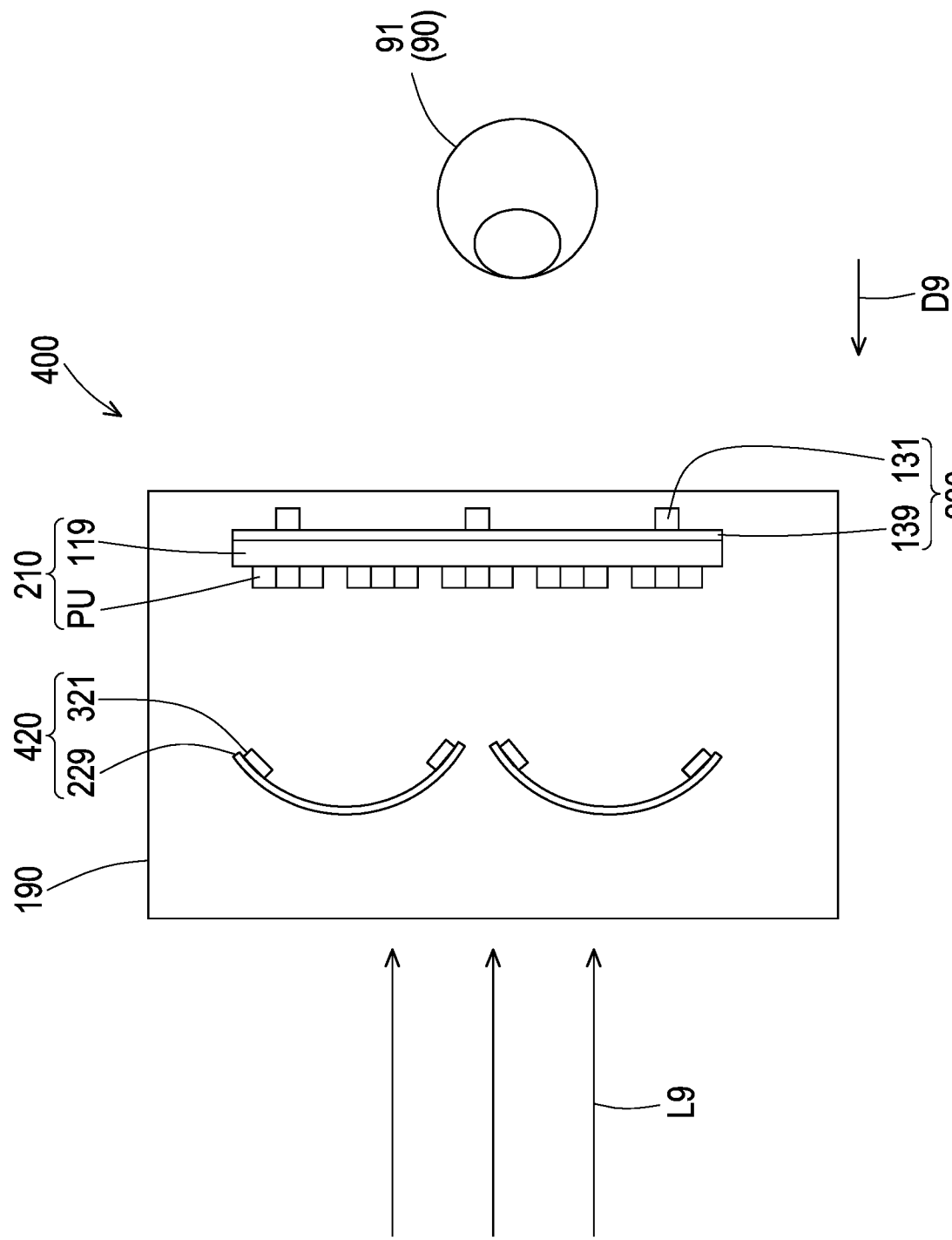
FIG. 8C is a schematic side view of a head-mounted augmented reality stereo vision optical film and an application manner thereof according to an embodiment of the disclosure.

FIG. 8C is a schematic side view of a head-mounted augmented reality stereo vision optical film and an application manner thereof according to an embodiment of the disclosure. The difference from the head-mounted augmented reality stereo vision optical film 300 in FIG. 8B lies in the setting manner of an optical projection layer 420 in a head-mounted augmented reality stereo vision optical film 400.

In the embodiment, the optical projection layer 420 may have multiple curved surfaces. For example, the number of the substrate 229 may be multiple, and the corresponding optical microstructure 321 may be configured on each substrate 229.

Based on the above, in the head-mounted augmented reality stereo vision optical film of the disclosure, the light transmitting display layer can have higher resolution, higher brightness, higher transparency, and/or higher endurance; the optical projection layer can have a wider field of view and/or higher efficiency; and/or the eye tracking layer can have a preferred human machine interface (HMI), lower power consumption, a smaller volume, and/or preferred integration. In addition, by stacking and integrating the film layers of the light transmitting display layer, the optical projection layer, and the eye tracking layer, the head-mounted augmented reality stereo vision optical film can be lighter and thinner, have higher efficiency, a wider perspective, and/or a preferred interactive scenario.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A head-mounted augmented reality stereo vision optical film, comprising:
   a light transmitting display layer, having a plurality of pixel units and a light shielding layer corresponding to the pixel unit;
   an optical projection layer, having a plurality of light guide units, wherein the light guide unit corresponds to the pixel units; and
   an eye tracking layer, having a plurality of micro sensing elements, wherein in a viewing direction of a wearer, the optical projection layer is located between the light transmitting display layer and the eye tracking layer, wherein the light guide unit of the plurality of light guide units is configured as a single element corresponding to a subset of the pixel units, wherein the light guide unit is a combination of a microlens and a Fresnel lens, and in an optical path direction of the pixel unit, the microlens is located between the pixel unit and the Fresnel lens.

2. The head-mounted augmented reality stereo vision optical film according to claim 1, wherein the micro sensing elements are adapted to sense an eyeball of the wearer.

3. The head-mounted augmented reality stereo vision optical film according to claim 2, wherein there is a first distance between the light transmitting display layer and the optical projection layer, there is a second distance between the optical projection layer and the eye tracking layer, there is a viewing distance between the head-mounted augmented reality stereo vision optical film and the eyeball, and the viewing distance is greater than the first distance or the second distance.

4. The head-mounted augmented reality stereo vision optical film according to claim 3, wherein the first distance and the second distance are 0.

5. The head-mounted augmented reality stereo vision optical film according to claim 1, wherein the light transmitting display layer, the optical projection layer, and the eye tracking layer are stacked on each other.

6. The head-mounted augmented reality stereo vision optical film according to claim 1, wherein the light guide unit further comprises a lens, wherein within a unit area range, a number of the micro sensing elements is less than a number of the pixel units or a number of the lens.

7. The head-mounted augmented reality stereo vision optical film according to claim 6, wherein within the unit area range, the number of the pixel units or the number of the lens is 100 times more than the number of the micro sensing elements.

8. The head-mounted augmented reality stereo vision optical film according to claim 1, wherein the eye tracking layer comprises a light shape control layer located on the micro sensing elements.

9. The head-mounted augmented reality stereo vision optical film according to claim 1, wherein the optical projection layer comprises a light transmitting substrate.

10. The head-mounted augmented reality stereo vision optical film according to claim 1, wherein the eye tracking layer further comprises a reflection coating layer.

11. The head-mounted augmented reality stereo vision optical film according to claim 1, further comprising:
    a control unit, wherein the eye tracking layer further comprises an element layer electrically connected to the control unit.

12. The head-mounted augmented reality stereo vision optical film according to claim 1, wherein the light guide unit further comprises a metalens.

13. The head-mounted augmented reality stereo vision optical film according to claim 1, wherein in the viewing direction of the wearer, the light shielding layer is located between the wearer and the pixel unit, the light shielding layer has a pinhole, and the pinhole of the light shielding layer corresponds to the pixel unit.

14. The head-mounted augmented reality stereo vision optical film according to claim 1, wherein in the viewing direction of the wearer, the pixel unit is located between the wearer and the light shielding layer, and the light shielding layer overlaps with the pixel unit.

15. The head-mounted augmented reality stereo vision optical film according to claim 1, wherein the pixel unit comprises a light emitting element adapted to be adjusted by dynamic pixel tuning.

16. The head-mounted augmented reality stereo vision optical film according to claim 1, wherein the pixel unit comprises at least one light emitting element, and the light guide unit is configured corresponding to the light emitting element.

17. A head-mounted augmented reality stereo vision optical film, comprising:
    a light transmitting display layer, having a plurality of pixel units and a light shielding layer corresponding to the pixel unit;

an optical projection layer, having a plurality of light guide units, wherein the light guide unit corresponds to the pixel units; and an eye tracking layer, having a plurality of micro sensing elements, wherein in a viewing direction of a wearer, the optical projection layer is located between the light transmitting display layer and the eye tracking layer, wherein a width of the light guide unit is less than half of a light emitting wavelength of a corresponding first light emitting element.

18. The head-mounted augmented reality stereo vision optical film according to claim 1, wherein the light guide unit further comprises at least one pinhole.

* * * * *